United States Patent
Wong et al.

(10) Patent No.: US 11,160,064 B2
(45) Date of Patent: Oct. 26, 2021

(54) COMMUNICATIONS DEVICE, INFRASTRUCTURE EQUIPMENT, WIRELESS COMMUNICATIONS SYSTEMS AND METHODS

(71) Applicant: CONVIDA WIRELESS, LLC, Wilmington, DE (US)

(72) Inventors: Shin Horng Wong, Basingstoke (GB); Martin Warwick Beale, Basingstoke (GB)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/968,168

(22) PCT Filed: Feb. 8, 2019

(86) PCT No.: PCT/EP2019/053188
§ 371 (c)(1),
(2) Date: Aug. 7, 2020

(87) PCT Pub. No.: WO2019/158447
PCT Pub. Date: Aug. 22, 2019

(65) Prior Publication Data
US 2021/0235439 A1 Jul. 29, 2021

(30) Foreign Application Priority Data
Feb. 16, 2018 (EP) .................................... 18157260

(51) Int. Cl.
*H04W 72/04* (2009.01)
(52) U.S. Cl.
CPC .............. *H04W 72/0413* (2013.01)

(58) Field of Classification Search
CPC ... H04W 76/30; H04W 76/34; H04W 72/042; H04W 72/1289
See application file for complete search history.

(56) References Cited

U.S. PATENT DOCUMENTS

| | | | |
|---|---|---|---|
| 9,554,342 B2* | 1/2017 | Li | H04W 52/58 |
| 2017/0303248 A1* | 10/2017 | Chatterjee | H04L 1/1861 |
| 2018/0063824 A1* | 3/2018 | Kim | H04W 72/044 |
| 2018/0084548 A1* | 3/2018 | Min | H04L 5/0062 |

FOREIGN PATENT DOCUMENTS

| | | |
|---|---|---|
| WO | 2016/073591 A1 | 5/2016 |
| WO | 2017/144262 A1 | 8/2017 |
| WO | 2017/153118 A1 | 9/2017 |

OTHER PUBLICATIONS

International Search Report and Written Opinion dated May 7, 2019 for PCT/EP2019/053188 filed on Feb. 8, 2019, 11 pages.

* cited by examiner

*Primary Examiner* — Kevin Kim
(74) *Attorney, Agent, or Firm* — BakerHostetler

(57) ABSTRACT

A communications device includes transmitter circuitry configured to transmit signals to the infrastructure equipment via a wireless access interface provided by the wireless communications network, receiver circuitry configured to receive signals from the infrastructure equipment via the wireless access interface, and controller circuitry. The controller circuitry is configured to, among other things, control the transmitter circuitry and the receiver circuitry to monitor a first search space for a first radio signal from the infrastructure equipment.

23 Claims, 12 Drawing Sheets

1 subframe
8 candidates of 1 AL 1 subframe
4 candidates of 2 AL 1 subframe
2 candidates of 4 AL 1 subframe
1 candidate of 8 AL

COMMUNICATIONS DEVICE, INFRASTRUCTURE EQUIPMENT, WIRELESS COMMUNICATIONS SYSTEMS AND METHODS

CROSS-REFERENCE TO RELATED APPLICATIONS

The present application is based on PCT filing PCT/EP2019/053188, filed Feb. 8, 2019, which claims priority to EP 18157260.3, filed Feb. 16, 2018, the entire contents of each are incorporated herein by reference.

BACKGROUND

Field of Disclosure

The present disclosure relates to communications devices and infrastructure equipment of wireless communications systems.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with very low latency and very high reliability. A single device type might also be associated with different data traffic profiles/characteristics depending on the application(s) it is running For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "The Internet of Things" (or IoT for short). The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). At least some devices making use of these technologies are expected to be low complexity and inexpensive devices requiring relatively infrequent communication of relatively low bandwidth data.

The increasing use of different types of communications devices associated with different traffic profiles gives rise to new challenges for efficiently handling communications in wireless telecommunications systems that need to be addressed, particularly, but not exclusively, in respect of low power devices.

SUMMARY OF THE DISCLOSURE

The present disclosure can help address or mitigate at least some of the issues discussed above as defined in the appended claims.

Embodiments of the present technique can provide a communications device for use in a wireless communications network comprising infrastructure equipment. The communications device comprises transmitter circuitry configured to transmit signals to the infrastructure equipment via a wireless access interface provided by the wireless communications network, receiver circuitry configured to receive signals from the infrastructure equipment via the wireless access interface, and controller circuitry. The controller circuitry is configured to control the transmitter circuitry and the receiver circuitry to monitor a first search space for a first radio signal from the infrastructure equipment, the first search space containing candidates of the first radio signal, each candidate having an associated one of a plurality of repetition levels forming part of a repetition level set, the associated repetition level indicating a number of repetitions with which the candidate may be transmitted, the first radio signal containing scheduling information for the transmission of a second radio signal by the communications device to the infrastructure equipment, to transmit, upon detecting the first radio signal in the first search space, the second radio signal to the infrastructure equipment, the second radio signal being repeatedly transmitted a predetermined number of times during each of a plurality of consecutive time periods, to monitor a second search space for one or more third radio signals from the infrastructure equipment, the second search space being a portion of known frequency resources and known time resources of the wireless access interface and comprising one or more candidates of the third radio signals each having an associated repetition level of the repetition level set, to determine that at least one of the third radio signals are monitored during the transmission of the second radio signal, wherein the one or more third radio signals are repeatedly transmitted using one of the candidates of the third radio signals a number of times indicated by the repetition level associated with the selected candidate of the third radio signal, to monitor, on the basis of at least one criterion of the first radio signal and/or the second radio signal and/or third radio signal, for an early termination indicator during a known subset of the frequency resources and the time resources of the wireless access interface in which the one or more third radio signals can be received, the early termination indicator being received from the infrastructure equipment and indicating that transmission of the second radio signal to the infrastructure equipment should be terminated, and to terminate transmission of the second radio signal to the infrastructure equipment on the basis of the received early termination indicator.

Embodiments of the present technique, which also relate to infrastructure equipment, wireless communications systems, methods for operating communications devices, infrastructure equipment and wireless communications systems, and circuitry for communications devices, infrastructure equipment and wireless communications systems, can provide arrangements in which the periodicity of a search space, in which a communications device is operable to find an early termination indicator indicating that it should terminate a repeated transmission of an uplink signal, is a function of the scheduling channel (MPDCCH) and/or the scheduled uplink signal transmission. Accordingly, embodiments of the present technique allow communications devices to save power by terminating transmission of a repeated uplink signal when the receiving infrastructure equipment acknowledges it has been successfully received.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution (LTE) Wireless Communications System

Figure 1:
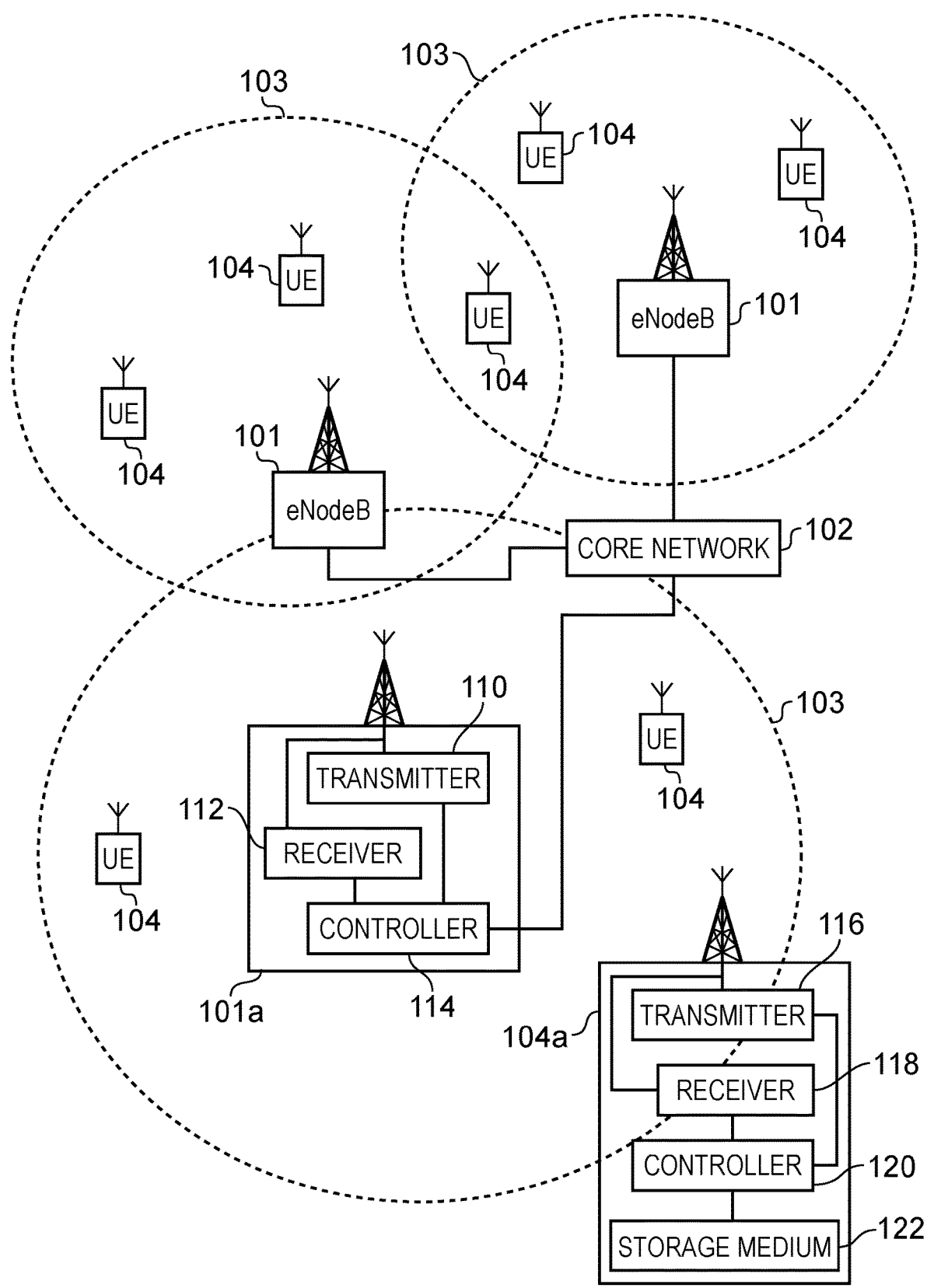
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

FIG. 1 provides a schematic diagram of a mobile telecommunications system, where the system includes infrastructure equipment comprising base stations 101 which are connected to a core network 102, which operates in accordance with a conventional arrangement which will be understood by those acquainted with communications technology. The infrastructure equipment 101 may also be referred to as a base station, network element, infrastructure apparatus, enhanced Node B (eNodeB/eNB), a general Node B (gNodeB/gNB) or a coordinating entity for example, and provides a wireless access interface to the one or more communications devices within a coverage area or cell represented by a broken line 103. One or more mobile communications devices 104 may communicate data via the transmission and reception of signals representing data using the wireless access interface.

The core network 102 may also provide functionality including authentication, mobility management, charging and so on for the communications devices served by the network entity. The mobile communications devices of FIG. 1 may also be referred to as communications terminals, user equipment (UEs), communications devices, terminal devices and so forth, and are configured to communicate with one or more other communications devices served by the same or a different coverage area via the network entity. These communications may be performed by transmitting and receiving signals representing data using the wireless access interface over the two way communications links.

The communications system may operate in accordance with any known protocol, for instance in some examples the system may operate in accordance with a 3GPP Long Term Evolution (LTE) or 5G/New Radio (NR) standard.

As shown in FIG. 1, one of the base stations 101a is shown in more detail to include a transmitter 110 for transmitting signals via a wireless access interface to the one or more communications devices or UEs 104, and a receiver 112 to receive signals from the one or more UEs within the coverage area 103. A controller 114 controls the transmitter 110 and the receiver 112 to transmit and receive the signals via the wireless access interface. The controller 114 may perform a function of controlling the allocation of communications resource elements of the wireless access interface and may in some examples include a scheduler for scheduling transmissions via the wireless access interface for both an uplink (UL) and the downlink (DL).

In this example, the infrastructure equipment 101a comprises a transmitter 110 for transmission of wireless signals, a receiver 112 for reception of wireless signals and a controller 114 configured to control infrastructure equipment 1001a to operate in accordance with embodiments of the present disclosure as described herein. The controller 114 may comprise various sub-units, such as a scheduler, for providing functionality in accordance with embodiments of the present disclosure as explained further below. These sub-units may be implemented as discrete hardware elements or as appropriately configured functions of the controller 114. Thus, the controller 114 may comprise a processor which is suitably configured/programmed to provide the desired functionality described herein using conventional programming/configuration techniques for equipment in wireless telecommunications systems. The transmitter 110, receiver 112 and controller 114 are schematically shown in FIG. 1 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the infrastructure equipment 101a will in general comprise various other elements associated with its operating functionality, such as a scheduler. For example, although not shown in FIG. 1 for simplicity, the controller 114 may comprise a scheduler, that is to say the controller 114 may provide the scheduling function for the base station.

An example UE 104a is shown in more detail to include a transmitter 116 for transmitting signals on the uplink of the wireless access interface to the eNodeB 103 and a receiver 118 for receiving signals transmitted by the base station 101 on the downlink via the wireless access interface. The UE 104a also comprises a storage medium 122, such as a solid state memory or similar, for storing data. The transmitter 116, receiver 118 and storage medium 122 are controlled by a controller 120. In the embodiments of the present disclosure, the UE 104a is a communications device configured to operate using feMTC (Further Enhanced Machine Type Communications) or eNB-IoT (Enhanced Narrowband Internet of Things). The controller 120 may comprise various sub-units for providing functionality in accordance with embodiments of the present disclosure as explained further herein. These sub-units may be implemented as discrete hardware elements or as appropriately configured functions of the controller 120. Thus the controller 120 may comprise a processor which is suitably configured/programmed to provide the desired functionality described herein using conventional programming/configuration techniques for equipment in wireless telecommunications systems. The transmitter 116, receiver 118 and controller 120 are schematically shown in FIG. 1 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the communications device 104a will in general comprise various other elements associated with its operating functionality, for example a power source, user interface, and so forth, but these are not shown in FIG. 1 in the interests of simplicity.

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIG. 2.

Figure 2:
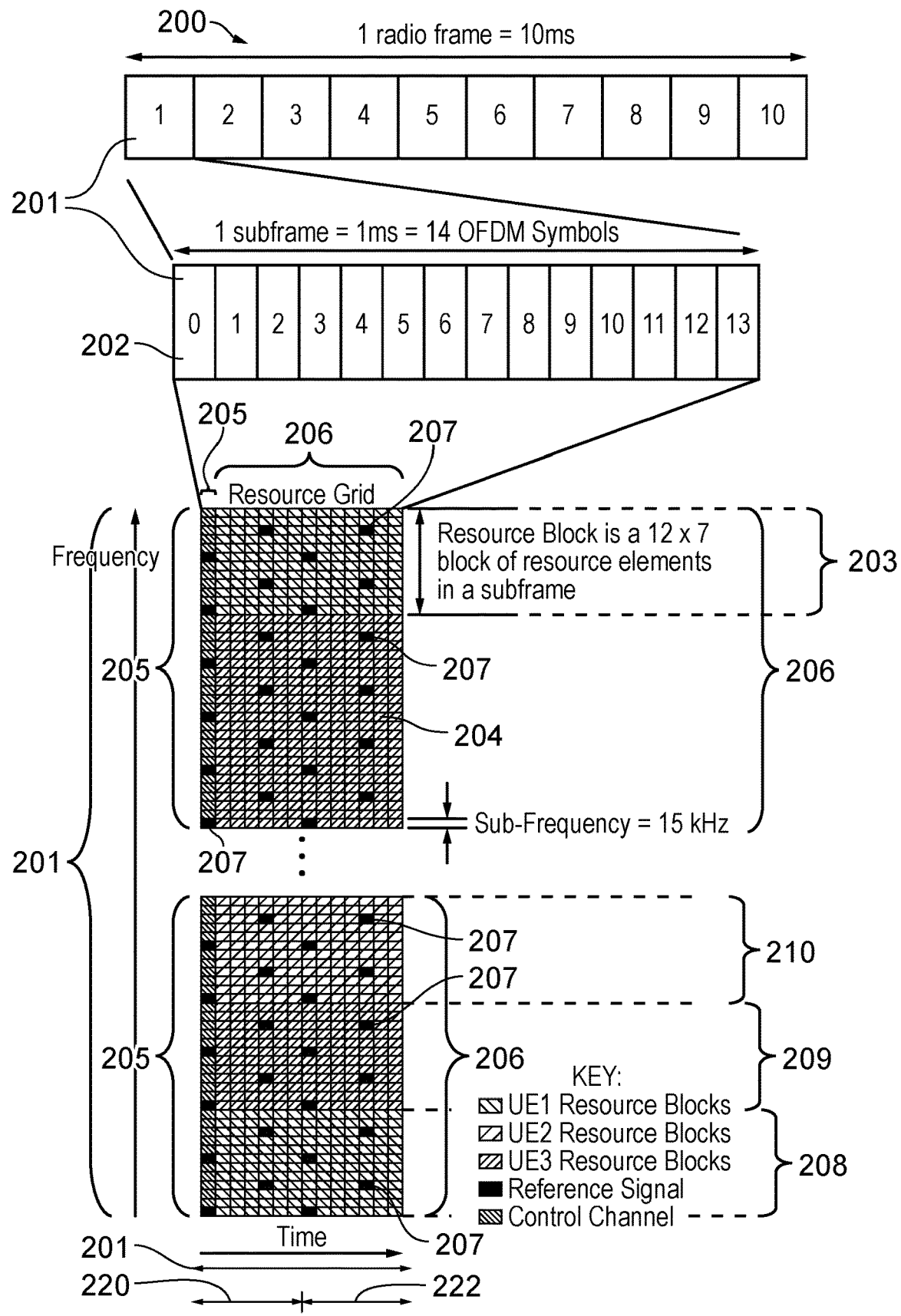
FIG. 2 provides a schematic diagram of a structure of a downlink of a wireless access interface of a mobile communications system operating according to an LTE standard.

FIG. 2 provides a simplified schematic diagram of the structure of a downlink of a wireless access interface that may be provided by or in association with the base station of FIG. 1 when the communications system is operating in accordance with the LTE standard. In LTE systems the wireless access interface of the downlink from a base station to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHz and 20 MHz bandwidth may be divided into orthogonal subcarriers. Not all of these subcarriers are used to transmit data. The number of subcarriers varies between 72 subcarriers (1.4 MHz) and 1200 subcarriers (20 MHz). In some examples the subcarriers are grouped to form a scheduling blocks. A resource block (RB) can consist of 12 sub-carriers. A narrowband in MTC can consist of 6 RBs or 72 subcarriers. Each subcarrier bandwidth may take any value but in LTE it is fixed at 15 kHz. As shown in FIG. 2, the resources of the wireless access interface are also temporally divided into frames where a frame 200 lasts 10 ms and is subdivided into 10 subframes 201 each with a duration of 1 ms. Each subframe 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. The frame structure also contains primary synchronisation signals (PSS) and secondary synchronisation signals (SSS): not shown in FIG. 2. The PSS occupies the central 62 subcarriers of the $7^{th}$ OFDM symbol of the first subframe and the $7^{th}$ OFDM symbol of the $6^{th}$ subframe of the radio frame. The SSS occupies the central 62 subcarriers of the $6^{th}$ OFDM symbol of the first subframe and the central 62 subcarriers of the $6^{th}$ OFDM symbol of the $6^{th}$ subframe of the radio frame.

Figure 3:
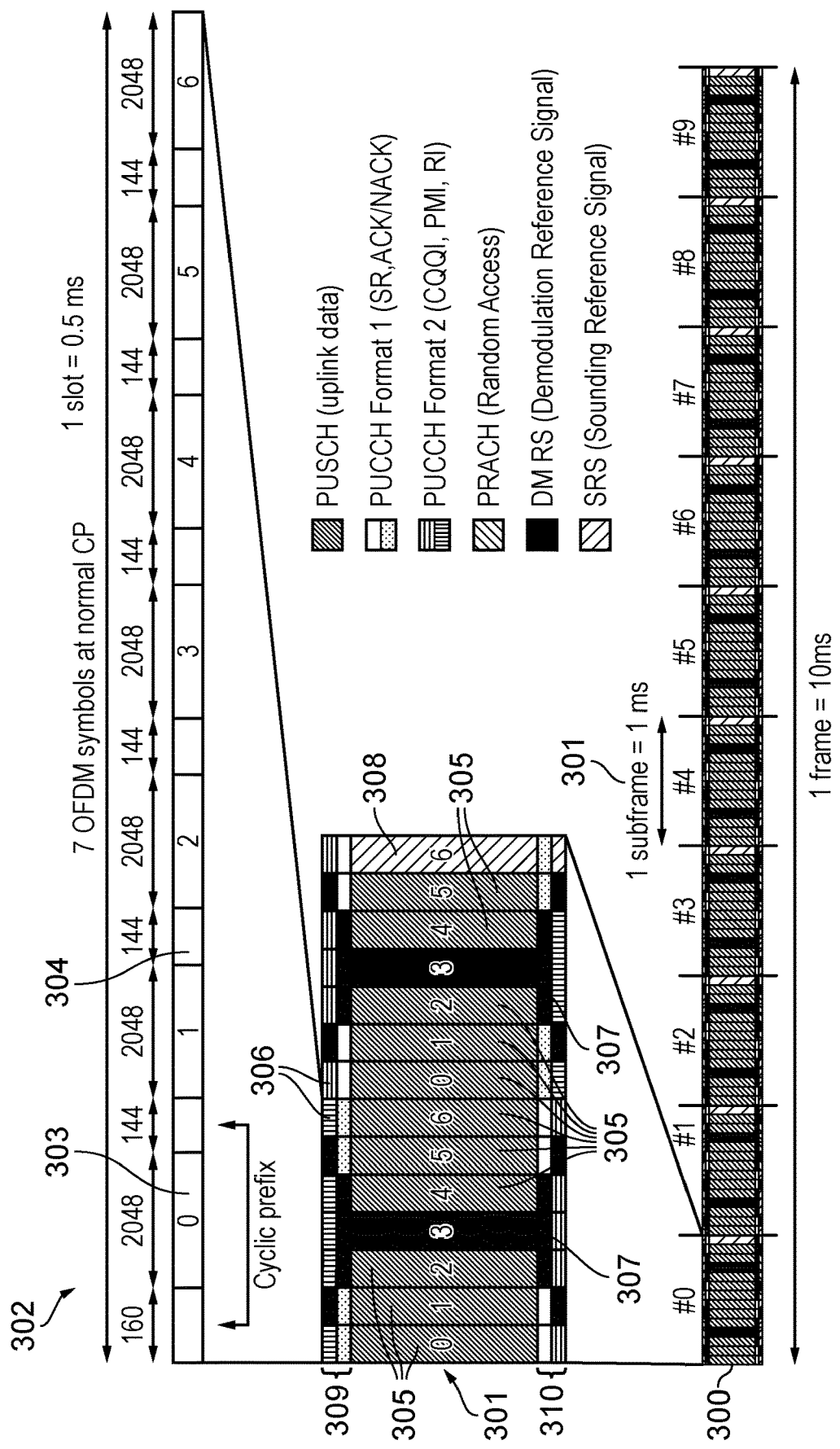
FIG. 3 provides a schematic diagram of an uplink of a wireless access interface of a mobile communications system operating according to an LTE standard.

FIG. 3 provides a simplified schematic diagram of the structure of an uplink of an LTE wireless access interface that may be provided by or in association with the base station of FIG. 1. In LTE networks, the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes.

Before a terminal can use a cell provided by a base station, the terminal is expected to carry out a series of steps. For example, a terminal may be in a situation where it has not yet achieved synchronisation after a long DRX period or after having being switched on. A terminal would be expected to detect the cell and cell-ID using the Primary Synchronisation Signal (PSS) and Secondary Synchronisation Signal (SSS), and then receive the System Information (MIB) from the Physical Broadcast Channel (PBCH) and further System Information from the PDSCH. More specifically a terminal would have to first achieve time and frequency synchronisation with the cell, typically using the legacy PSS and SSS emitted by the base station. Then, the terminal will decode the PBCH to acquire the MIB. The MIB contains amongst other things information for the terminal to acquire further System Information, namely SIB1-BR that is transmitted via the PDSCH. SIB1-BR contains scheduling information for acquiring the remaining System Information portions (other SIBs).

As described above, it is expected future wireless communications networks will be expected to efficiently support communications with devices including reduced complexity devices or machine type communication (MTC) devices, which may be deployed for supporting the "The Internet of Things", and may typically be associated with the transmissions of relatively small amounts of data with relatively high latency tolerance.

PUSCH Repetition and Early Termination

3GPP has completed two Release 14 Work Items on Internet of Things (IoT), namely feMTC (Further Enhanced Machine Type Communications) [2] and eNB-IoT (Enhanced Narrowband Internet of Things) [3]. The IoT is further enhanced in 3GPP by introducing two additional Release 15 Work Items namely, efeMTC (Even Further Enhanced Machine Type Communications) [4] and feNB-IoT (Further Enhanced Narrowband Internet of Things) [5].

In Release 13 and Release 14 MTC, the eNodeB does not provide an explicit HARQ acknowledgement to the UE's uplink physical uplink shared channel (PUSCH) transmissions. Instead, the UE assumes that a PUSCH packet is received successfully when the eNodeB sends an uplink grant (via downlink control information (DCI)) for a new PUSCH transmission for the same HARQ process. At the UE, a timer is started when the PUSCH is transmitted such that in the absence of an uplink grant, the UE would assume the PUSCH packet is received successfully upon expiry of this timer. In Release 15, an explicit hybrid automatic repeat request (HARQ) acknowledgement (HARQ-ACK) for PUSCH transmission is introduced. This explicit uplink (PUSCH) HARQ-ACK offers two benefits:

When a radio resource control (RRC) Connection Release message is transmitted from the eNodeB to the UE, the UE executes the connection release and moves into idle mode after either 1.25 seconds, or when the lower layers inform the UE RRC layer that the PUSCH confirming the receipt of the RRC Connection Release message has been acknowledged, whichever comes first [6]. Hence, an explicit UL HARQ-ACK of this PUSCH confirmation would allow the UE to quickly execute this connection release and move into a low power consumption mode such as idle mode.

Figure 4:
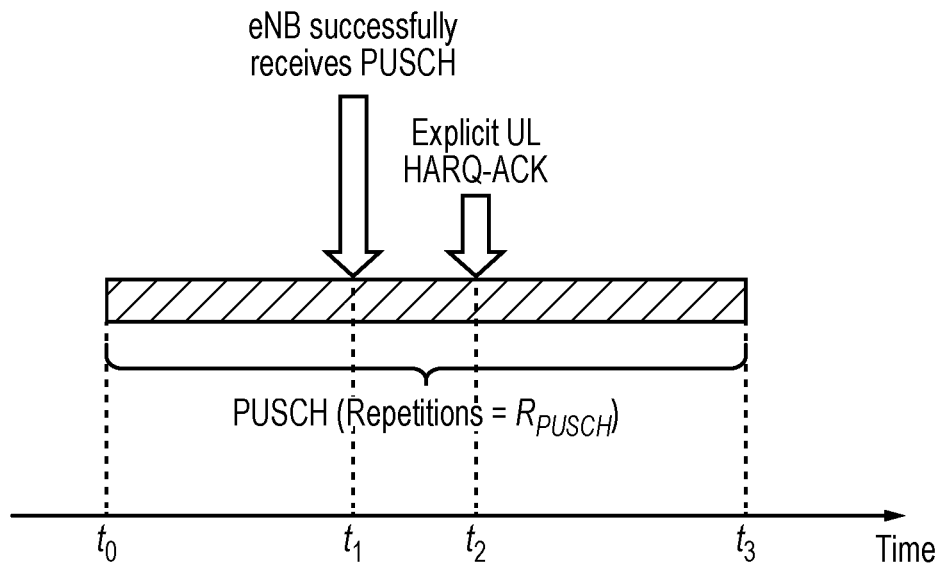
FIG. 4 illustrates an example of early PUSCH repetition termination.

In coverage enhancement, the PUSCH is repeated numerous times to overcome the large path loss between UE and eNodeB. The number of PUSCH repetitions can be up to 2048, which would consume significant amounts of energy. The eNodeB may receive the PUSCH transport block successfully before the entire PUSCH repetition is complete. For example, in FIG. 4, a PUSCH transmission with $R_{PUSCH}$ repetitions starts at time $t_0$ and expects to complete the transmission at time $t_3$. However, the eNodeB successfully received this PUSCH at time $t_1$ and hence the remaining PUSCH transmissions are redundant and waste UE battery power. Recognising this, 3GPP agreed that an explicit UL HARQ-ACK can be transmitted to early terminate the PUSCH repetition. That is, upon receiving the PUSCH, the eNodeB can transmit an explicit UL HARQ-ACK to the UE at time $t_2$ to tell the UE to terminate the PUSCH transmission, thereby saving UE power consumption.

MPDCCH Search Space

In eMTC, the DCI is carried by an MPDCCH, which is transmitted in an MPDCCH Search Space. A Search Space is a set of time and frequency resources configured by the network where this Search Space consists of a plurality of MPDCCH candidates. The eNodeB selects one of these MPDCCH candidates to carry a DCI (downlink control information), which is transmitted to one or more UEs (for broadcast, the DCI addresses multiple UEs). If the eNodeB has no MPDCCH to transmit, none of the MPDCCH candidates will be used. The UE has to blind decode every MPDCCH candidate to detect for a potential MPDCCH transmission, even if none is transmitted by the eNodeB. By using a Search Space, the eNodeB has the flexibility to schedule the MPDCCH transmission. For example, it can use more resources to provide a robust MPDCCH transmission for UE at the cell edge and fewer resources for UE close to the cell.

An MPDCCH candidate occupies a subset of the resources in the Search Space and can be defined in terms of:
  Aggregation Level (AL): number of frequency resources used.
  Repetition Level (RL): number of time resources used. The Repetition Level maps to a specific number of repetitions, e.g. Repetition Level 1 map to 8 MPDCCH repetitions, Repetition Level 2 maps to 16 MPDCCH repetitions, etc. This mapping is configured by RRC.
  Frequency Location: The exact location in frequency of the MPDCCH candidate.
  Time Location: The start and end time of the MPDCCH candidate.

Figure 5:
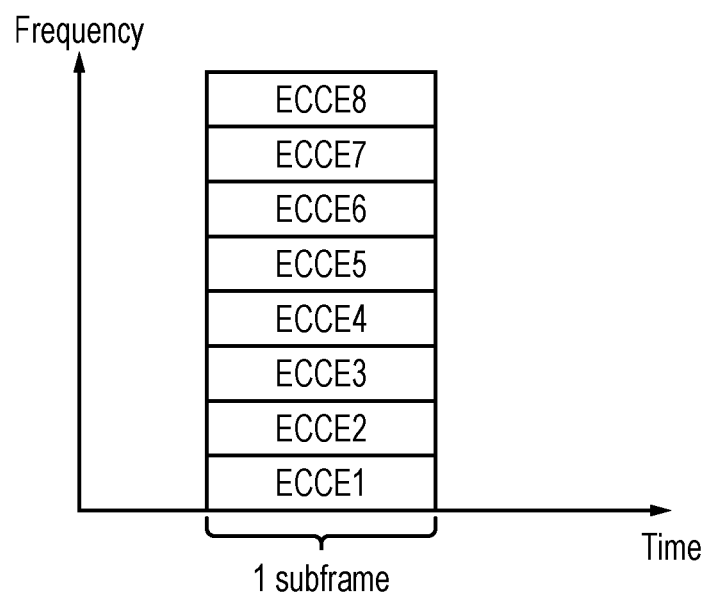
FIG. 5 illustrates an example of an enhanced control channel element (ECCE) in a 2-resource block search space.
Figure 6A:
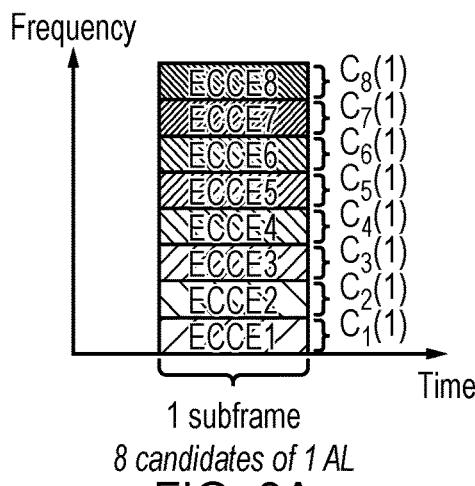
FIGS. 6A to 6D show four examples of candidates in a search space having different aggregation levels (ALs)
Figure 6B:
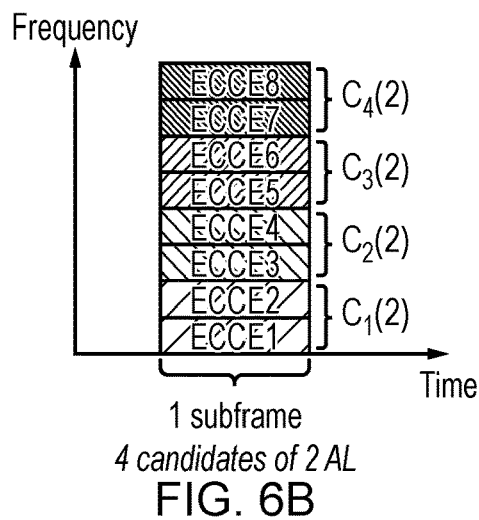
Figure 6C:
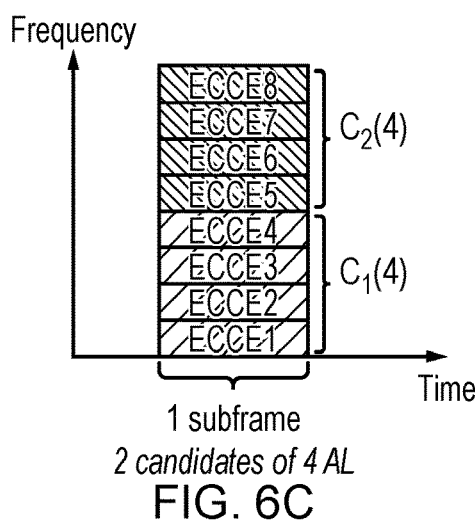
Figure 6D:
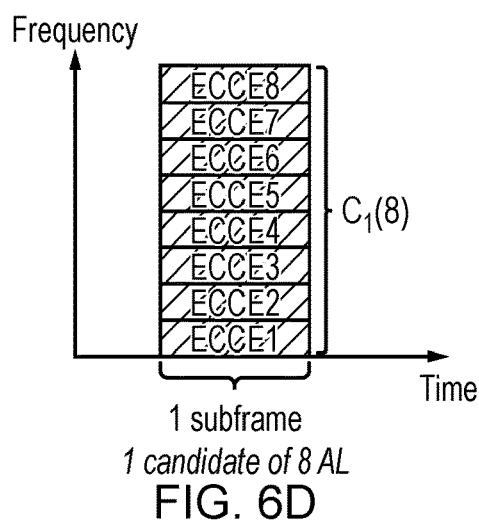

An Enhanced Control Channel Element (ECCE) is a frequency resource granularity that an MPDCCH can occupy. A resource block (RB) (12 subcarriers×1 subframe) consists of 4 ECCEs, and so in an eMTC narrowband of 6 PRBs there is a maximum of 24 ECCEs. The Aggregation Level of an MPDCCH candidate is the number of ECCEs it uses. FIG. 5 shows an MPDCCH Search Space in the logical domain that consumes 2 RBs or 8 ECCEs. Here, the Repetition Level aspect is ignored, or it assumed that only one Repetition Level=1 subframe.

For the Search Space of 2 RBs in FIG. 5, candidates can be defined in terms of different ALs and starting position (in the logical frequency domain). An example is shown in FIG. 6, where there are 8×AL=1 candidates in FIG. 6A, 4×AL=2 candidates in FIG. 6B, 2×AL=4 candidates in FIG. 6C and 1×AL=8 candidates in FIG. 6D, giving a total of 15 MPDCCH candidates (8+4+2+1) which a UE monitoring this Search Space has to blind decode for. It can be observed that if the eNB transmits a DCI using an MPDCCH with AL=1, e.g. using candidate $C_1(1)$, it can transmit another 7 DCIs (to other UEs) using the remaining 7 candidates of AL=1 or 4 DCIs using candidates $C_2(1)$, $C_2(2)$, $C_3(2)$ & $C_4(2)$. The eNB cannot use the same resources to transmit multiple DCIs, for example if candidate $C_1(4)$ of AL=4 is used, the eNB can no longer use candidates $C_1(1)$, $C_2(1)$, $C_3(1)$, $C_4(1)$, $C_1(2)$, $C_2(2)$ and $C_1(8)$ since their resources overlap fully or partially with those used by $C_1(4)$, i.e. ECCE1, ECCE2, ECCE3 and ECCE4. It should be noted that other Search Space sizes, e.g. 4 RBs or 8 RBs would have different numbers of candidates and different types of candidates. The candidates in a Search Space are configured by RRC.

Figure 7:
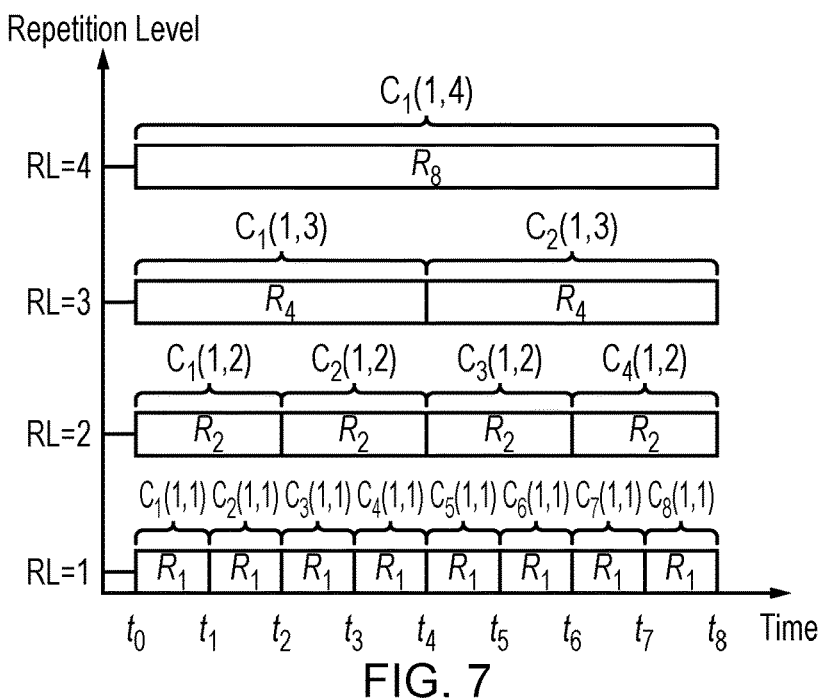
FIG. 7 illustrates how candidates in a search space may have one of multiple different repetition levels.

As described, another dimension of the MPDCCH Search Space is the Repetition Level. There are up to four Repetition Levels (RL) defined in an MPDCCH Search Space. To illustrate this concept, the AL component is firstly ignored, i.e. it is assumed that all candidates have the same AL=1 and denote a candidate as $C_k(A, R)$ for the $k^{th}$ candidate with Aggregation Level A and Repetition Level R. FIG. 7 shows the MPDCCH Search Space in the time domain. It should be noted that the Repetition Level is not the same as the number of repetitions. Here, Repetition Level 1 has $R_1$ number of repetitions, Repetition Level 2 has $R_2$ number of repetitions, Repetition Level 3 has $R_3$ number of repetitions and Repetition Level 4 has $R_8$ number of repetitions. Typically, the number of repetitions doubles when the RL increases by one step. The actual repetition numbers are configured by RRC, e.g. $\{R_1=8, R_2=16, R_3=32, R_4=64\}$ or $\{R_1=32, R_2=64, R_3=128, R_4=256\}$ or any other repetitions defined in the specifications. In this Search Space, there are 8×RL=1 candidates with $R_1$ repetitions, 4×RL=2 candidates with $R_2$ repetitions, 2×RL=3 candidates with $R_4$ repetitions and 1×RL=4 candidates with $R_8$ repetitions. Similar to the AL case, the eNodeB cannot transmit two candidates if their resources overlap. That is if the eNodeB transmits a DCI using candidate $C_2(\mathbf{1,3})$, it cannot use candidates $C_5(\mathbf{1,1})$, $C_6(\mathbf{1,1})$, $C_7(\mathbf{1,1})$, $C_8(\mathbf{1,1})$, $C_3(\mathbf{1,2})$, $C_4(\mathbf{1,2})$ and $C_1(\mathbf{1,4})$. The other candidates can be used to transmit other DCI to other UEs.

Figure 8:
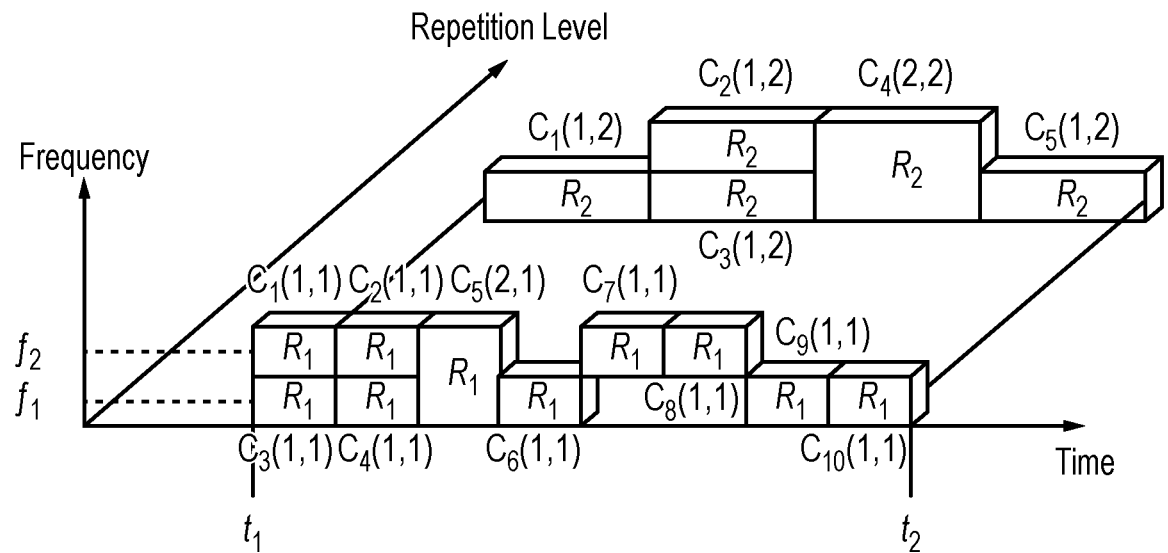
FIG. 8 shows an example of a hypothetical search space.

To illustrate the AL and RL components of an MPDCCH Search Space, a hypothetical (or rather simplified) search space is shown in FIG. 8, occupying frequency resources from $f_1$ to $f_2$ and time resources $t_1$ to $t_2$. There is a total of 15 MPDCCH candidates in this search space where 10 candidates are at RL=1 $\{C_1(\mathbf{1,1}), C_2(\mathbf{1,1}), C_3(\mathbf{1,1}), C_4(\mathbf{1,1}), C_5(\mathbf{2,1}), C_6(\mathbf{1,1}), C_7(\mathbf{1,1}), C_8(\mathbf{1,1}), C_9(\mathbf{1,1}), C_{10}(\mathbf{1,1})\}$ and 5 candidates are at RL=2 $\{C_1(\mathbf{1,2}), C_2(\mathbf{1,2}), C_3(\mathbf{1,2}), C_4(\mathbf{2,2}), C_5(\mathbf{1,2})\}$. 13 of the candidates have AL=1 whilst 2 candidates have AL=2 $\{C_5(\mathbf{2,1}), C_4(\mathbf{2,2})\}$. 5 candidates with AL=1 occupies frequency resource $f_2$ $\{C_1(\mathbf{1,1}), C_2(\mathbf{1,1}), C_7(\mathbf{1,1}), C_8(\mathbf{1,1}), C_2(\mathbf{1,2})\}$. Similarly, if a candidate is used for transmission of DCI, the resources (time and frequency) that it occupies would block other candidates that have overlapping resources from transmission. For example, if $C_5(\mathbf{2,1})$ is transmitted it would block candidates $C_2(\mathbf{1,2})$ and $C_3(\mathbf{1,2})$. It should be noted that this search space arrangement is merely hypothetical; it does not exist in the 3GPP specifications.

It can be observed that a search space with frequency and time dimension can contain different mixes of candidates with different ALs, RLs, frequency locations and time locations. A set of possible (limited) candidates for a given number of frequency resources is defined in the 3GPP specifications.

Explicit UL HARQ-ACK Transmission

Figure 9:
FIG. 9 illustrates an example of the periodicity of MPDCCH transmissions being greater than a period of PUSCH repetition.
Figure 9:
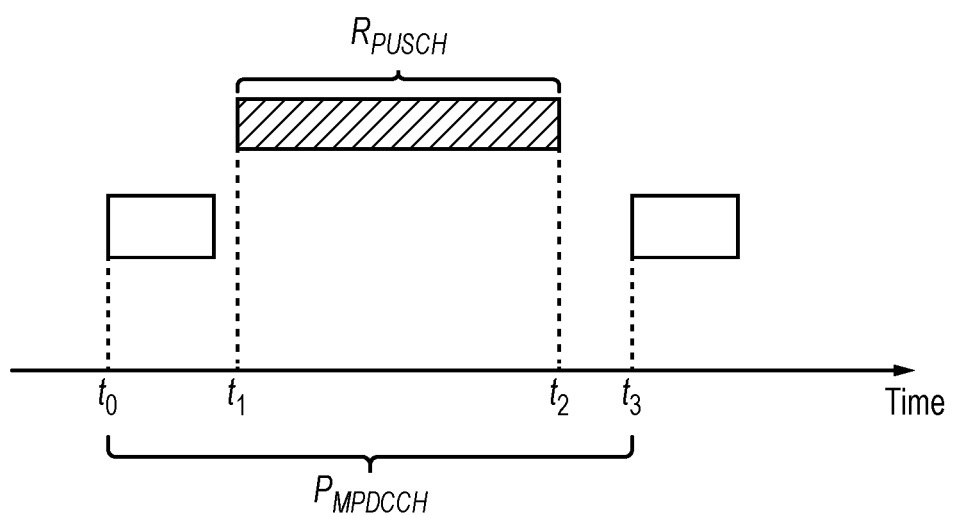

It was agreed in 3GPP that this explicit UL HARQ-ACK is carried by a DCI in TDD and full duplex FDD (FD-FDD), which is transmitted using the MPDCCH. A search space is configured for the monitoring of MPDCCH, in which the UE blind decodes for a possible MPDCCH transmission periodically. The periodicity of the MPDCCH search space however may not be suitable for transmission of explicit UL HARQ-ACK. An example is shown in FIG. 9, where a UE specific MPDCCH Search Space (SS) starts at time $t_0$ and has a periodicity of $P_{MPDCCH}$ such that the next MPDCCH SS begins at time $t_3$. However, the scheduled PUSCH has a repetition $R_{PUSCH}$ that is less than the MPCCH period $P_{MPDCCH}$ (i.e. $R_{PUSCH} < P_{MPDCCH}$) and hence there is no opportunity for the eNodeB to transmit an early PUSCH termination (i.e. explicit UL HARQ-ACK) to the UE.

Figure 10:
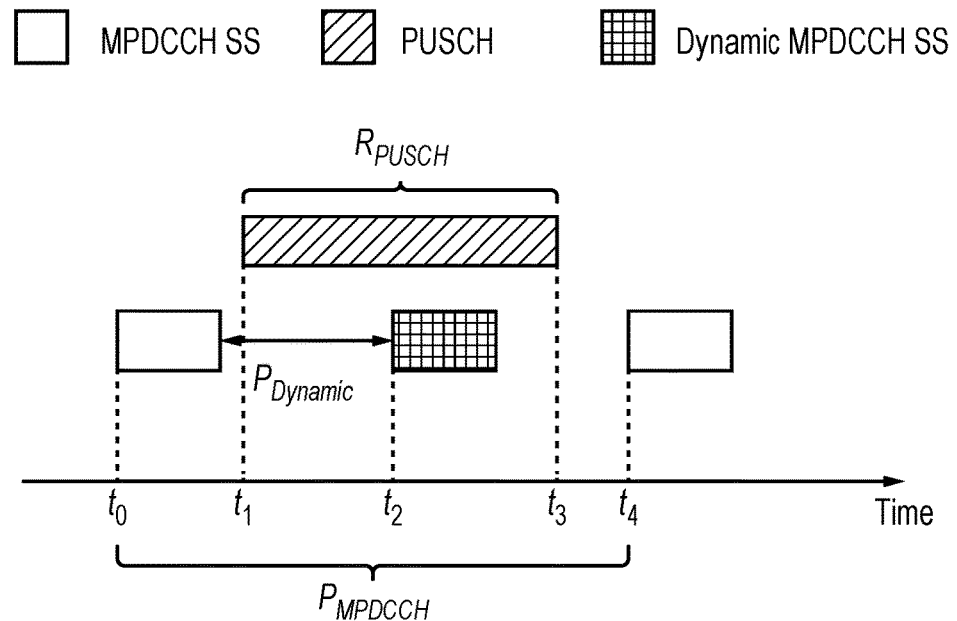
FIG. 10 illustrates an example of a dynamic MPDCCH search space.

Recognising the issue described in FIG. 9, in [7] it is proposed that a new MPDCCH SS is introduced that has a periodicity being a function of the scheduled PUSCH repetition. That is, a dynamic MPDCCH SS is configured with a shorter periodicity, e.g. $P_{Dynamic}$ after the original MPDCCH SS. An example is shown in FIG. 10; where the DCI carried by the MPDCCH at time $t_0$ schedules a PUSCH, the UE would monitor a new dynamic MPDCCH SS at time $t_2$. The location of this dynamic MPDCCH SS is proposed to be a function of the scheduled PUSCH, e.g. $P_{Dynamic} = R_{PUSCH}/2$. It is further proposed that whether the UE needs to monitor this dynamic MPDCCH SS is indicated in the DCI that schedules the PUSCH.

Figure 11:
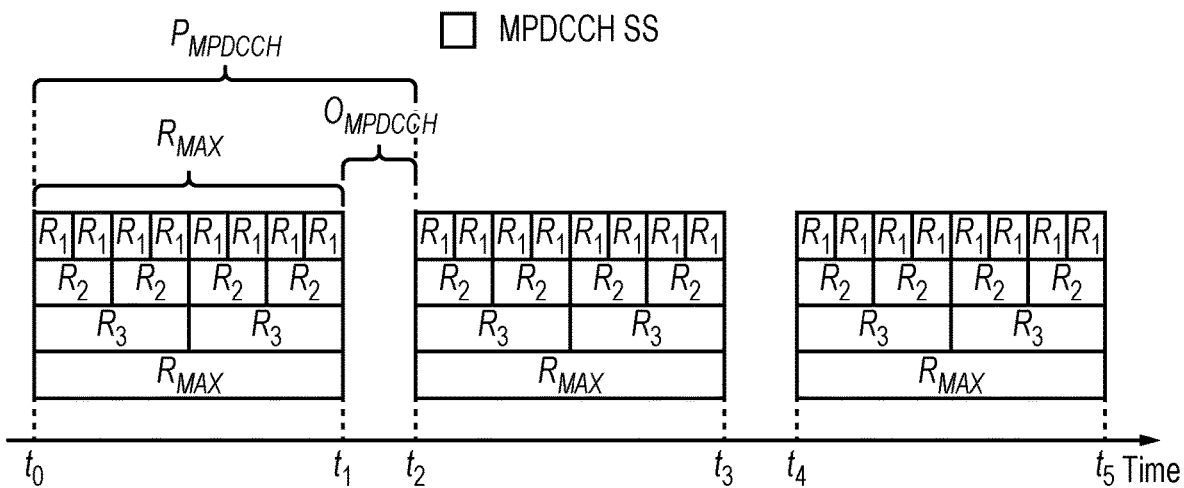
FIG. 11 illustrates an example of the periodicity of an MPDCCH search space.

It should be appreciated that the DCI carried by the MPDCCH typically has a smaller payload than that of a PUSCH and that the downlink benefits from higher transmission power from the eNodeB compared to that in the uplink. Hence, the MPDCCH repetition is likely to be much smaller than that of the PUSCH. For example, the maximum MPDCCH repetition $R_{MAX}$ is 256, whilst that of PUSCH is 2048. The periodicity of the MPDCCH SS is proportional to the maximum configured MPDCCH repetition $R_{MAX}$, i.e. $P_{MPDCCH} = R_{MAX} + O_{MPDCCH}$, where $O_{MPDCCH}$ is an offset $\{1, 1.5, 2, 2.5, 4, 5, 8, 10\}$ subframes as shown in FIG. 11. Here, the MPDCCH SS consists of multiple MPDCCH candidates that can have four different repetitions $\{R_1, R_2, R_3, R_{MAX}\}$ and in this example the MPDCCH SS starts at time $t_0$ and is monitored periodically with a periodicity of $P_{MPDCCH}$. Since the MPDCCH periodicity $P_{MPDCCH}$ is a function of the MPDCCH repetition and that PUSCH repetition is typically much longer than that of MPDCCH, it is highly likely that the PUSCH would overlap another MPDCCH SS thereby giving the eNodeB an opportunity to transmit an explicit UL HARQ-ACK.

Although the issues raised in [7] may be unlikely, there are other aspects that need to be solved in order for early PUSCH repetition termination to work efficiently.

Early PUSCH Repetition Termination Search Space

Figure 12:
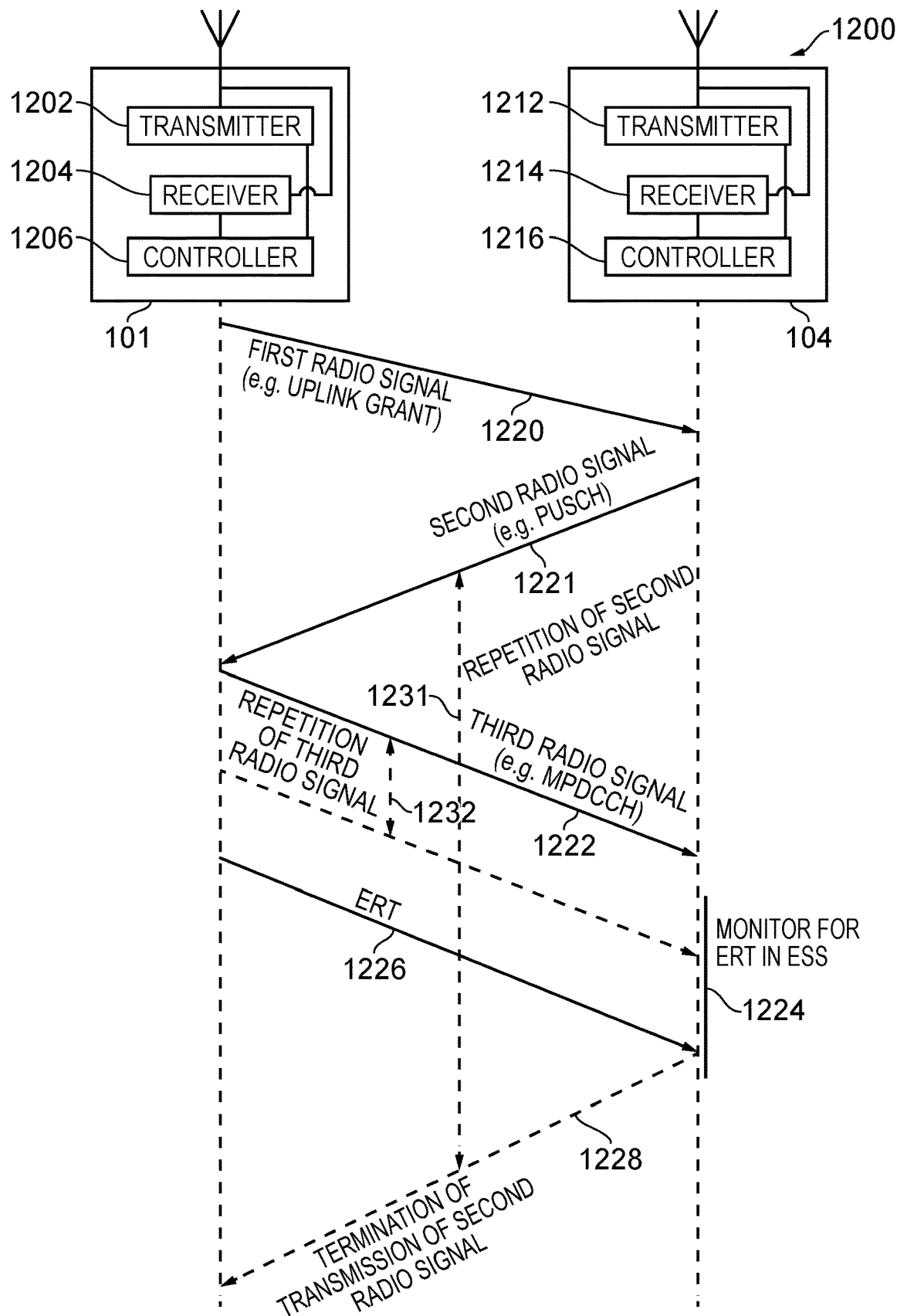
FIG. 12 shows a part schematic, part message flow diagram of communications in a wireless communications system in accordance with embodiments of the present technique.

FIG. 12 shows a part schematic, part message flow diagram representation of a communications system 1200 in accordance with embodiments of the present technique. The communications system 1200 comprises a wireless communications network comprising infrastructure equipment 101, and a communications device 104. Each of the infrastructure equipment 101 and communications device 104 comprise a transmitter (or transmitter circuitry) 1202, 1212, a receiver (or receiver circuitry) 1204, 1214, and a controller (or controller circuitry) 1206, 1216. Each of the controllers 1206, 1216 may be, for example, a microprocessor, a CPU, or a dedicated chipset, etc. It will be appreciated by those skilled in the art that, in arrangements of the present technique, the communications device 104 may not always include a transmitter 1212 or a capability for transmission, for example in scenarios where the communications device 104 is a low-power wearable device which only receives data.

As will be explained below, embodiments of the present technique can provide an arrangement in which the transmitter (or transmitter circuitry) 1202, the receiver (or receiver circuitry) 1204 and the controller 1206 in the infrastructure equipment 101 of the wireless communications network are configured in combination to provide a wireless access interface for communication between the infrastructure equipment 101 and the communications device 104. The controller circuitry 1216 of the communications device 104 is configured to control the transmitter circuitry 1212 and the receiver circuitry 1214 to monitor 1220 a first search space for a first radio signal from the infrastructure equipment 101, the first search space containing candidates of the first radio signal 1220 each having an associated one of a plurality of repetition levels forming part of a repetition level set, the associated repetition level set indicating a number of repetitions with which the candidate may be transmitted, the first radio signal 1220 containing scheduling information for the transmission of a second radio signal by the communications device 104 to the infrastructure equipment 101, to transmit 1221, upon detecting the first radio signal 1220 in the first search space, the second radio signal to the infrastructure equipment 101, the second radio signal 1221 being repeatedly transmitted 1231 a predetermined number of times during each of a plurality of consecutive time periods, to monitor 1222 a second search space for one or more third radio signals from the infrastructure equipment 101, the second search space being a portion of known frequency resources and known time resources of the wireless access interface and comprising one or more candidates of the third radio signals 1222 each having an associated repetition level of the repetition level set, to determine that at least one of the third radio signals 1222 are monitored during (i.e. overlap) the transmission of the second radio signal 1221, wherein the one or more third radio signals 1222 are repeatedly transmitted 1232 using one of the candidates of the third radio signals a number of times indicated by the repetition level associated with the selected candidate of the third radio signal to monitor 1224, on the basis of at least one criterion of the scheduling message (DCl/MPDCCH) for the first radio signal 1220 and/or the second radio signal 1221 and/or the third radio signal 1222, for an early termination indicator 1226 contained within a known subset of the frequency resources and the time resources of the wireless access interface in which the one or more third radio signals 1222 can be received, the early termination indicator being received 1226 from the infrastructure equipment 101 and indicating that transmission of the second radio signal 1221 to the infrastructure equipment 101 should be terminated, and to terminate transmission 1228 of the second radio signal 1221 to the infrastructure equipment 101 on the basis of the received early termination indicator 1226.

Embodiments of the present technique propose that the monitoring for an Early uplink (PUSCH) Repetitions Termination (ERT) indicator at known time/frequency locations follows a criterion that is a function of the MPDCCH repetition. The said known ERT location is termed as the ERT Search Space (ESS) in this disclosure. The UE will monitor the ESS if it is configured for ERT operation. Although in efeMTC the ERT is carried by a DCI transmitted using MPDCCH, embodiments of the present technique are also applicable for ERT that is carried by other types of PDCCH, e.g. NPDCCH (Narrowband PDCCH), EPDCCH and PDCCH.

In an example arrangement, the said function is N multiples of MPDCCH repetitions. That is, the said criterion is that ESS is monitored if the PUSCH repetition is greater than N multiples of MPDCCH repetition. In other words, the criterion on which the early termination indicator is monitored for is whether a time over which the second radio signal is repeatedly transmitted is greater than a time required for a specified number of the third radio signals or the first radio signals to be repeatedly transmitted using a highest of the repetition levels of the repetition level set.

The value N can be specified in the specifications, RRC configured or indicated in the DCI. This arrangement recognises that if the PUSCH repetition is twice that of MPDCCH, then there is no point transmitting an ERT since the PUSCH repetition would have ended when the ERT arrives. For example, in FIG. 13, a DCI carried by a MPDCCH with repetition $R_{MAX}$ at time $t_0$ schedules a PUSCH of repetition $R_{PUSCH}$, where $R_{PUSCH} = 2 \times R_{MAX}$. The periodicity of the MPDCCH SS, $P_{MPDCCH}$ has an offset $O_{MPDCCH}=4$ subframes and hence the PUSCH and the following MPDCCH SS starts at time $t_2$. At time $t_2$, it is too soon to be transmitting an ERT since the eNodeB would not have sufficient PUSCH repetitive samples. Assuming the eNodeB receives the PUSCH at time $t_3$ (or any time prior to $t_3$), the next opportunity that it can transmit an ERT is at time $t_4$ (with $R_{MAX}$ repetition). However, by the time the eNodeB completes the ERT transmission at time $t_6$, the UE would already have completed the PUSCH repetitions, that is the ERT arrives too late to be of any use. Hence, in order to have any meaningful savings on PUSCH transmission, N should be at least 3.

Figure 13:
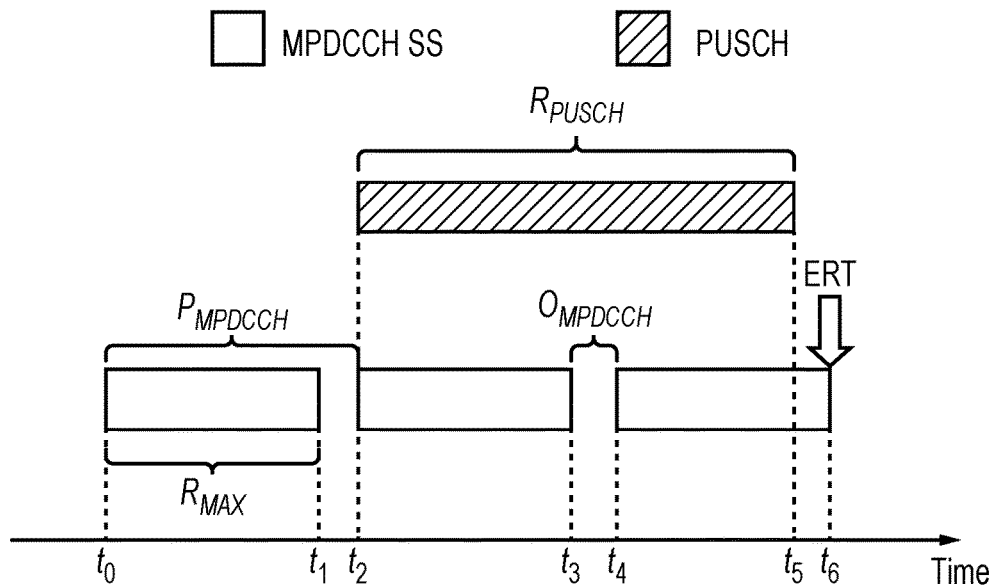
FIG. 13 shows a first example of the use of an early termination indicator (ERT) indicating that PUSCH transmissions should be terminated in accordance with embodiments of the present technique.

In another example arrangement, the said function is N multiples of the MPDCCH periodicity. That is, the monitoring of ERT is a function of the MPDCCH SS periodicity $P_{MPDCCH}$, i.e. $R_{PUSCH}>N \times P_{MPDCCH}$. In other words, between two search spaces of the third radio signal, an offset period of a predetermined duration is present, and wherein the criterion on which the early termination indicator is monitored for is whether a time over which the second radio signal is repeatedly transmitted is greater than a time required for a specified candidate of the third radio signal to be transmitted with the highest of the repetition levels of the repetition level set in addition to the duration of the specified number of offset periods. This arrangement takes into account the offset $O_{MPDCCH}$, as can be seen in FIG. 13.

In another example arrangement, the said ESS, i.e. known ERT (time/frequency) location is the configured UE specific MPDCCH SS, i.e., the UE specific MPCDCH SS where the UE monitors for potential DL and UL grants. In other words, the known subset of the frequency resources and the time resources of the wireless access interface in which the second search space for the third radio signal is located is the same as the frequency resources and the time resources used for the first search space of the first radio signal In another example arrangement, the said MPDCCH repetition is the scheduled MPDCCH repetition. In other words, the criterion on which the early termination indicator is monitored for is whether a time over which the second radio signal is repeatedly transmitted is greater than a time required for a specified number of the first radio signals to be repeatedly transmitted using the repetition level of the repetition level set that was selected by the infrastructure equipment for repeatedly transmitting the first radio signals.

Figure 14:
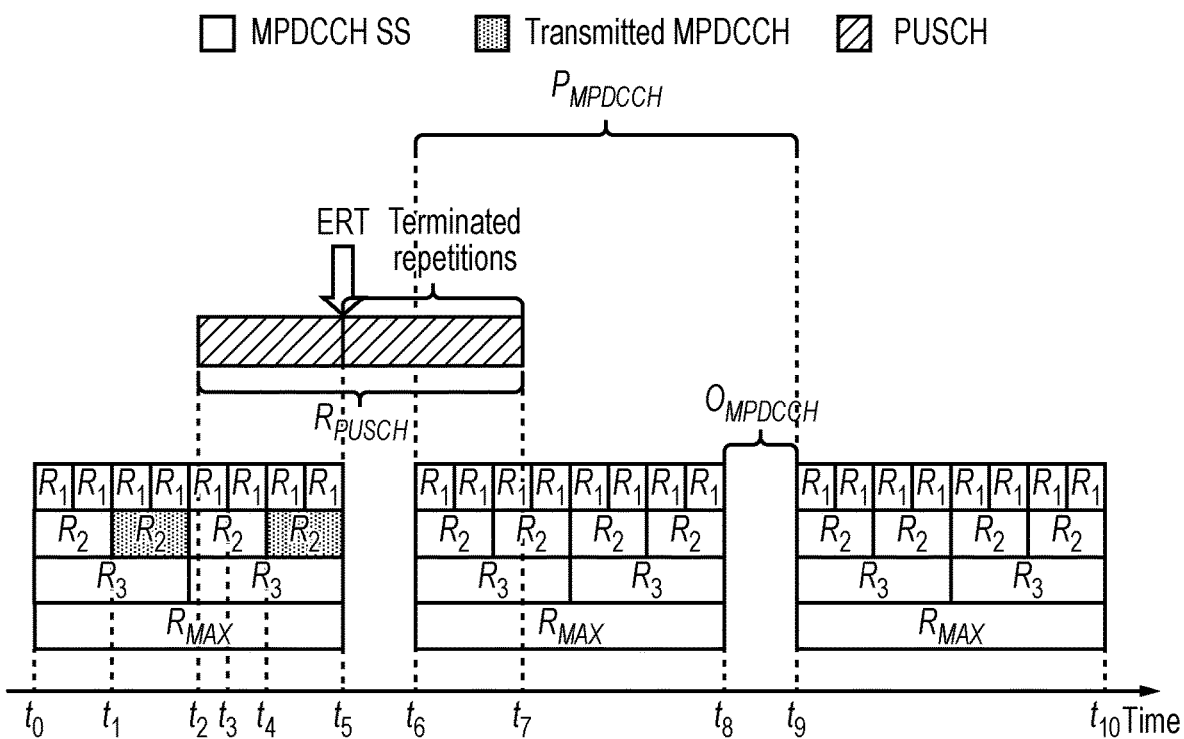
FIG. 14 shows a second example of the use of an ERT indicating that PUSCH transmissions should be terminated in accordance with embodiments of the present technique.

It should be noted that the MPDCCH SS consists of multiple candidates that can have multiple (i.e. four) different repetitions as shown in FIG. 11 as $\{R_1, R_2, R_3, R_{MAX}\}$ where the eNodeB can use one of these repetitions to transmit the MPDCCH and the UE would blind detect for the transmitted candidate. Using one of the criteria in the above arrangements, the UE will monitor the ESS if the scheduled PUSCH repetition $R_{PUSCH}>N \times R_S$, where $R_S=\{R_1, R_2, R_3, R_{MAX}\}$ is the transmitted MPDCCH repetition. For example, in FIG. 14, the UE is configured to monitor a UE Specific SS (USS) with a periodicity of $P_{MPDCCH}$. In the MPDCCH SS starting at time $t_0$, the eNodeB transmits a DCI containing an UL grant at time $t_1$ using a candidate with $R_2$ repetitions. Here the said criterion is set such that N=3. Although the scheduled PUSCH has a repetition $R_{PUSCH}<3 \times R_{MAX}$, it meets the criterion $R_{PUSCH}>3 \times R_S$, where $R_S=R_2$ is the scheduled MPDCCH (at time $t_1$) and so the UE monitors the ESS. In this example, the ERT is transmitted using an MPDCCH candidate with repetition $R_2$ at time $t_4$, where the UE receives the ERT at the end of this MPDCCH transmission at time $t_5$. The UE then terminates the remaining PUSCH repetitions from time $t_5$ onwards as shown in FIG. 14 diagonally dashed and shaded in dark grey. This arrangement recognises that the selected MPDCCH repetition used for the UL grant is likely to be used again by the eNodeB for transmission of ERT.

In another example arrangement, the said MPDCCH repetition is the scheduled MPDCCH $R_S$ plus an offset K, i.e. $R_{S+K}$, where S is the scheduled repetition level $\{1, 2, 3, MAX\}$. That is the UE monitors the ESS if the scheduled PUSCH repetition $R_{PUSCH}>N \times R_{S+K}$, where K can be specified in the specifications, RRC configured or indicated in the DCI scheduling the PUSCH (in the UL grant). In other words, a repetition level of the repetition level set that was selected by the infrastructure equipment for repeatedly transmitting the first radio signal is offset by a predetermined amount, and the criterion on which the early termination indicator is monitored for is whether a time over which the second radio signal is repeatedly transmitted is greater than a time required for a specified number of the first radio signals to be repeatedly transmitted using the offset repetition level.

Figure 15:
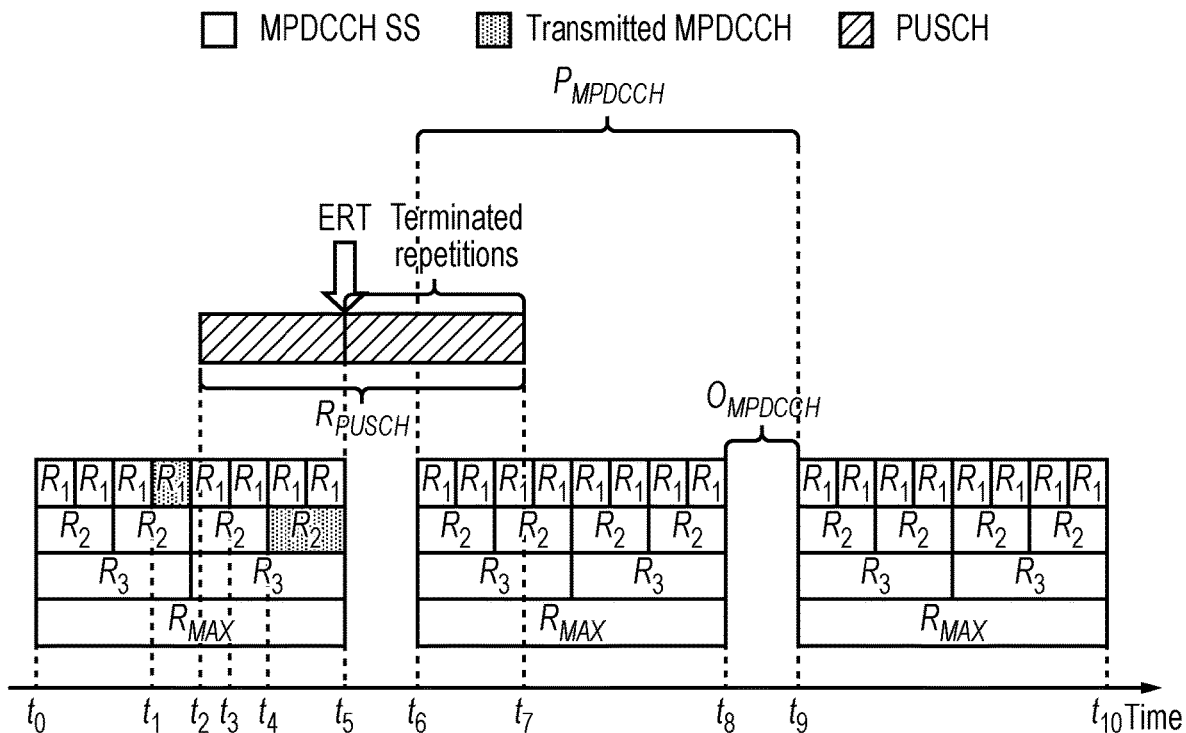
FIG. 15 shows a third example of the use of an ERT indicating that PUSCH transmissions should be terminated in accordance with embodiments of the present technique.

An example of this arrangement is shown in FIG. 15, where a USS with periodicity $P_{MPDCCH}$ is configured for a UE. In the USS (i.e. UE specific MPDCCH SS) at time $t_0$, the eNodeB transmits a DCI carrying an UL grant using MPDCCH with repetition $R_1$ at time $t_1$, which schedules a PUSCH with repetition $R_{PUSCH}$. Here, N=3 and K=1. Since the scheduled repetition level S=1, the repetition required in the criterion is $R_{S+K}=R_2$, i.e. ESS is monitored if $R_{PUSCH}>3 \times R_2$, which is met in this example. The UE transmits the PUSCH at time $t_2$ and the UE successfully receives the PUSCH prior to $t_4$, in which it transmits an ERT using an MPDCCH candidate in the ESS with repetition $R_2$ at time $t_4$. The UE then terminates the PUSCH repetitions at time $t_5$ after receiving the ERT. This arrangement recognises that the eNodeB is likely to use an MPDCCH repetition for the ERT that is close to that used for the UL grant to schedule the PUSCH.

In another example arrangement, the ESS consists of the remaining MPDCCH candidates in the search space that schedules the PUSCH, that is, the remaining MPDCCH candidates are candidates in the MPDCCH search space that are not blocked by the MPDCCH candidate used for the uplink grant. In other words, one or more of the first radio signal candidates of the first search space that share the same frequency resources and time resources of the wireless access interface as the candidate used for transmission of the first radio signal are blocked from use, and the known subset of the frequency resources and the time resources of the wireless access interface in which the one or more third radio signals can be monitored comprises the frequency resources and the time resources comprising the first radio signal candidates of the first search space that are not blocked from use.

Figure 16:
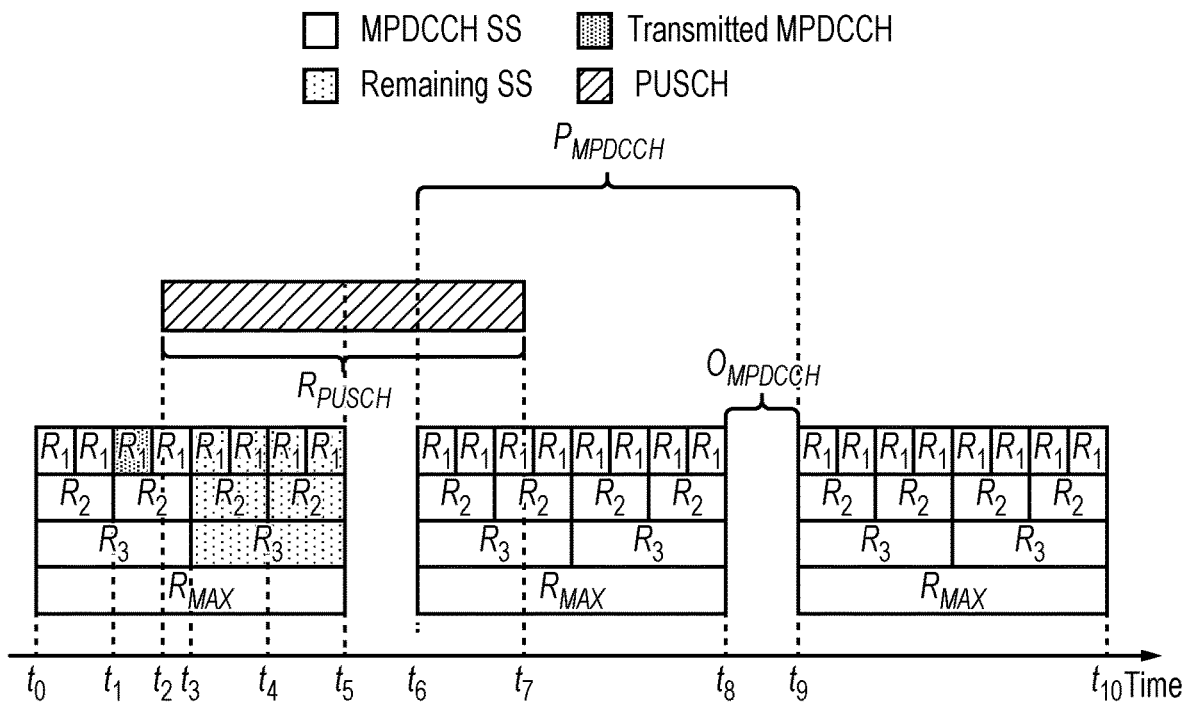
FIG. 16 shows an example arrangement in which remaining MPDCCH search spaces following the transmission of the MPDCCH are used as the search space for the ERT in accordance with embodiments of the present technique.

It should be appreciated that the arrangements described in FIG. 14 and FIG. 15 require the UE to monitor the remaining MPDCCH candidates of the USS (MPDCCH SS) that schedules the PUSCH for potential ERT transmission. An example is shown in FIG. 16, where an MPDCCH with repetition $R_1$ is transmitted at time $t_1$ to the UE that schedules a PUSCH. The PUSCH is transmitted at time $t_2$. The said remaining MPDCCH SS consists of those unblocked candidates that fully overlap the PUSCH transmission. In this example, these consist of the MPDCCH candidates starting at time $t_3$ and ending at time $t_5$. It should be noted that the UE would also monitor the MPDCCH SS at time $t_6$, i.e. the ESS contains part of the subsequent USS (or UE Specific MPDCCH SS).

In another example arrangement, the said ESS consists of MPDCCH candidates of the remaining MPDCCH SS and those in subsequent MPDCCH SS that fully overlap the PUSCH transmission with a start offset $T_{START}$ and an end offset $T_{END}$. In other words, the known subset of the frequency resources and the time resources of the wireless access interface in which the one or more third radio signals can be monitored further comprises a part of the known frequency resources and known time resources of the wireless access interface in which at least part of one or more subsequent first signals are monitored during the transmission of the second radio signal.

Figure 17:
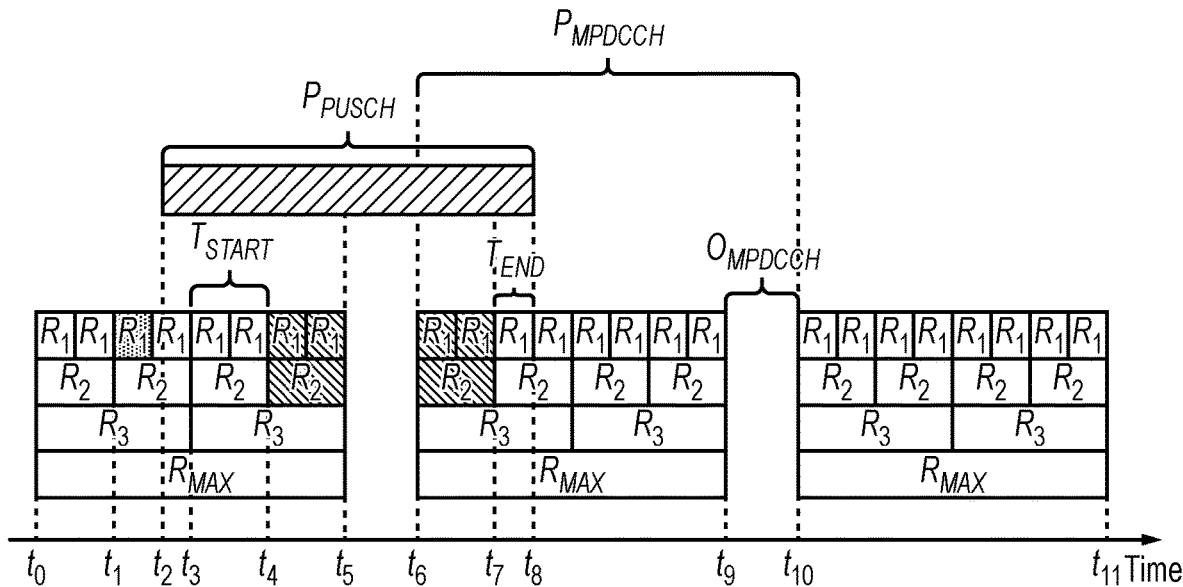
FIG. 17 shows an example arrangement in which remaining MPDCCH search spaces following the transmission of the MPDCCH and MPDCCH search spaces for the next MPDCCH transmission which overlap the PUSCH repetitions are used as the search space for the ERT in accordance with embodiments of the present technique.

The values $T_{START}$ and $T_{END}$ can be specified in the specifications, RRC configured or indicated in the DCI. This arrangement recognises that the eNodeB is unlikely to successfully receive the PUSCH during the early stages of the PUSCH repetition as it may not have received sufficient samples and hence an offset $T_{START}$ will avoid having the UE to look for ERT during these early stages of the PUSCH transmission. The $T_{END}$ is used if the remaining repetitions are insignificant or are completed by the time the UE receives the ERT and so there is no point monitoring for it. An example is shown in FIG. 17, where the eNodeB transmits an MPDCCH using repetition $R_1$ at time $t_1$ to schedule a PUSCH with repetition $R_{PUSCH}$ to the UE. Although the PUSCH fully overlaps the candidates in the remaining MPDCCH SS starting at time $t_3$, as per this arrangement, the ESS only starts after $T_{START}$, i.e. at time $t_4$. Similarly, although the PUSCH overlaps the MPDCCH candidates in the subsequent MPDCCH SS between time $t_6$ and $t_8$, the ESS ends $T_{END}$ prior to the end of the last fully overlapped MPDCCH candidate, i.e. at time $t_7$. This is because there is no point transmitting an ERT using the MPDCCH candidate starting at time $t_7$ since the ERT would arrive when the UE has completed the PUSCH repetitions.

In previous arrangements, the ESS reuses the MPDCCH candidates of the USS. In another example arrangement, the said ESS can occupy different frequency and time resources to those used by the USS (UE Specific MPDCCH Search Space). In other words, the known subset of the frequency resources and the time resources of the wireless access interface in which the one or more third radio signals can be received comprises frequency resources and time resources which fall between a configurable start time and a configurable end time. The MPDCCH candidates (i.e. repetitions) in this ESS fit between $T_{P-START}$ and $T_{P-END}$. It should be noted that $T_{P-START}$ can be different to $T_{START}$ (of FIG. 17) and $T_{P-END}$ can be different to $T_{END}$ (of FIG. 17). Generally, the configurable start time may be defined relative to a time at which the second signal starts to be transmitted, and the configurable end time may be defined relative to a latest time until which the scheduling information indicates that the communications device should transmit the second signal. In the example shown in FIG. 17, where the eNodeB transmits the MPDCCH using repetition $R_1$ at time $t_1$ to schedule the PUSCH with repetition $R_{PUSCH}$ to the UE, the configurable start time may be defined relative to a time at which remaining candidates of the first search space following the candidate used for transmission of the first signal starts, and the configurable end time may be defined relative to an end time of a last candidate of the first search space that overlaps with a latest time until which the scheduling information indicates that the communications device should transmit the second signal.

In a sub-arrangement of the above example arrangement, the repetitions of the candidates, $R_{ESS}$, are less than $R_{S+K}$. In other words, the frequency resources and time resources which fall between the configurable start time and the configurable end time form a third search space in which the one or more third radio signals can be received, the third search space comprising the third radio signal candidates which are associated with a repetition level of the repetition level set that was selected by the infrastructure equipment for transmitting the first radio signal in the first search space.

Figure 18:
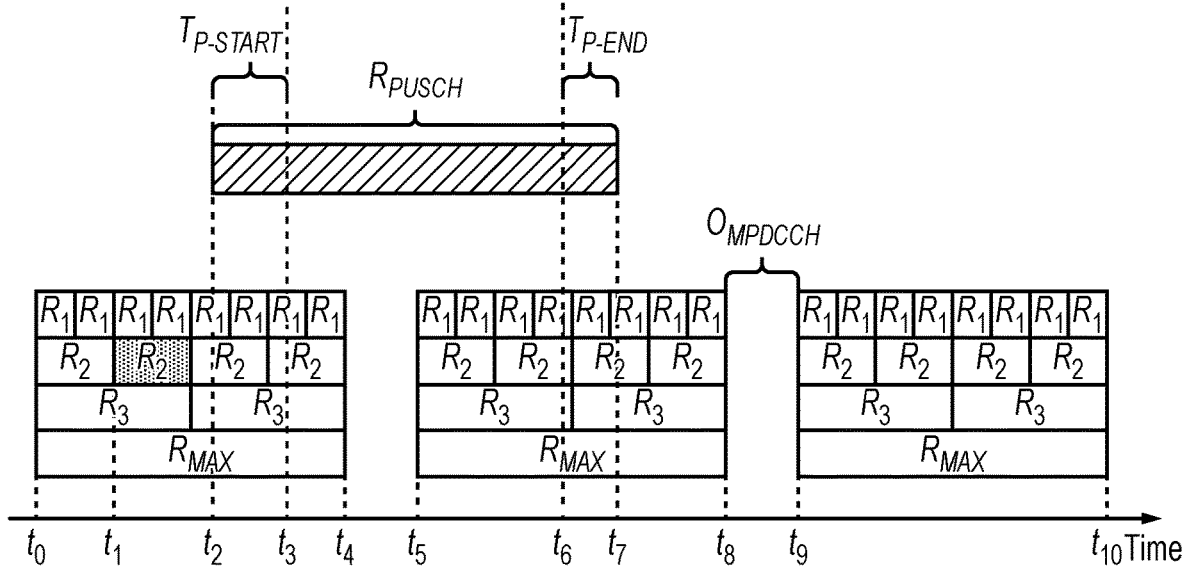
FIG. 18 shows an example arrangement similar to that shown by FIG. 17, but where only a subset of the MPDCCH repetitions are used as the search space for the ERT in accordance with embodiments of the present technique.

This arrangement recognises that the eNodeB is likely to use an MPDCCH repetition that is close to that used for the DCI scheduling the PUSCH. An example is shown in FIG. 18, where the eNB transmits an MPDCCH with repetition $R_2$ (i.e. $R_S=R_2$) at time $t_1$, which schedules a PUSCH of repetition $R_{RPUSCH}$. Here K=1, therefore $R_{S+K}=R_3$ and hence, the ESS repetitions are $R_{ESS}=\{R_1, R_2, R_3\}$. Factoring $T_{P-START}$ and $T_{P-END}$ the resultant ESS is therefore shown shaded with horizontal lines in FIG. 18.

Figure 19:
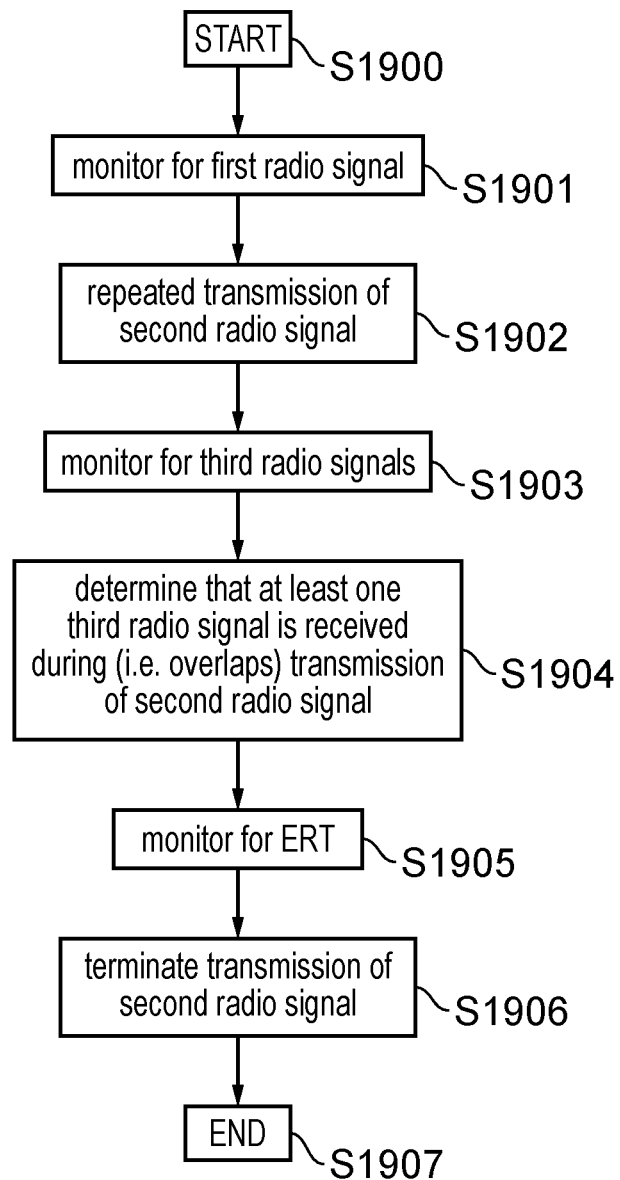
FIG. 19 shows a flow diagram illustrating a process of communications in a communications system in accordance with embodiments of the present technique.

FIG. 19 shows a flow diagram illustrating a process of communications in a communications system comprising an infrastructure equipment and a UE in accordance with embodiments of the present technique. The process is a method of operating the communications device. The process starts in step S1900. The method comprises in step S1901, monitoring a first search space for a first radio signal from the infrastructure equipment, the first search space containing candidates of the first radio signal each having an associated one of a plurality of repetition levels forming part of a repetition level set, the associated repetition level indicating a number of repetitions with which the candidate may be transmitted, the first radio signal containing scheduling information for the transmission of a second radio signal by the communications device to the infrastructure equipment. In step S1902, the method comprises transmitting, upon detecting the first radio signal in the first search space, the second radio signal to the infrastructure equipment, the second radio signal being repeatedly transmitted a predetermined number of times during each of a plurality of consecutive time periods. The process comprises, in step S1903, monitoring a second search space for one or more third radio signals from the infrastructure equipment, the second search space being a portion of known frequency resources and known time resources of the wireless access interface and comprising one or more candidates of the third radio signals each having an associated repetition level of the repetition level set. The method then advances to step S1904, which comprises determining that at least one of the third radio signals are monitored during the transmission of the second radio signal (i.e. it overlaps the transmission window of the second radio signal), wherein the one or more third radio signals are repeatedly transmitted using one of the candidates of the third radio signals a number of times indicated by the repetition level associated with the selected candidate of the third radio signal. The method further comprises, in step S1905, monitoring, on the basis of at least one criterion of the first radio signal and/or the second radio signal and/or third radio signal, for an early termination indicator during a known subset of the frequency resources and the time resources of the wireless access interface in which the one or more third radio signals can be received, the early termination indicator being received from the infrastructure equipment and indicating that transmission of the second radio signal to the infrastructure equipment should be terminated. The process then advances to step S1906, which comprises terminating transmission of the second radio signal to the infrastructure equipment on the basis of the received early termination indicator. The process ends in step S1907.

Those skilled in the art would appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

The following numbered paragraphs provide further example aspects and features of the present technique:

Paragraph 1. A communications device for use in a wireless communications network comprising infrastructure equipment, the communications device comprising
- transmitter circuitry configured to transmit signals to the infrastructure equipment via a wireless access interface provided by the wireless communications network,
- receiver circuitry configured to receive signals from the infrastructure equipment via the wireless access interface, and
- controller circuitry configured to control the transmitter circuitry and the receiver circuitry
  - to monitor a first search space for a first radio signal from the infrastructure equipment, the first search space containing candidates of the first radio signal each having an associated one of a plurality of repetition levels forming part of a repetition level set, the associated repetition level indicating a number of repetitions with which the candidate may be transmitted, the first radio signal containing scheduling information for the transmission of a second radio signal by the communications device to the infrastructure equipment,
  - to transmit, upon detecting the first radio signal in the first search space, the second radio signal to the infrastructure equipment, the second radio signal being repeatedly transmitted a predetermined number of times during each of a plurality of consecutive time periods,
  - to monitor a second search space for one or more third radio signals from the infrastructure equipment, the second search space being a portion of known frequency resources and known time resources of the wireless access interface and comprising one or more candidates of the third radio signals each having an associated repetition level of the repetition level set,
  - to determine that at least one of the third radio signals are monitored during the transmission of the second radio signal, wherein the one or more third radio signals are repeatedly transmitted using one of the candidates of the third radio signals a number of times indicated by the repetition level associated with the selected candidate of the third radio signal,
  - to monitor, on the basis of at least one criterion of the first radio signal and/or the second radio signal and/or third radio signal, for an early termination indicator during a known subset of the frequency resources and the time resources of the wireless access interface in which the one or more third radio signals can be received, the early termination indicator being received from the infrastructure equipment and indicating that transmission of the second radio signal to the infrastructure equipment should be terminated, and
  - to terminate transmission of the second radio signal to the infrastructure equipment on the basis of the received early termination indicator.

Paragraph 2. A communications device according to Paragraph 1, wherein the criterion on which the early termination indicator is monitored for is whether a time over which the second radio signal is repeatedly transmitted is greater than a time required for a specified number of the first radio signals to be repeatedly transmitted using a highest of the repetition levels of the repetition level set.

Paragraph 3. A communications device according to Paragraph 1 or Paragraph 2, wherein the criterion on which the early termination indicator is monitored for is whether a time over which the second radio signal is repeatedly transmitted is greater than a time required for a specified number of the third radio signals to be repeatedly transmitted using a highest of the repetition levels of the repetition level set.

Paragraph 4. A communications device according to any of Paragraphs 1 to 3, wherein between two search spaces of the third radio signal, an offset period of a predetermined duration is present, and
- wherein the criterion on which the early termination indicator is monitored for is whether a time over which the second radio signal is repeatedly transmitted is greater than a time required for a specified candidate of the third radio signal to be transmitted using a highest of the repetition levels of the repetition level set in addition to the duration of the specified number of offset periods.

Paragraph 5. A communication device according to any of Paragraphs 1 to 4, wherein the known subset of the frequency resources and the time resources of the wireless access interface in which the second search space for the third radio signal is located is the same as the frequency resources and the time resources used for the first search space of the first radio signal.

Paragraph 6. A communications device according to any of Paragraphs 1 to 5, wherein the criterion on which the early termination indicator is monitored for is whether a time over which the second radio signal is repeatedly transmitted is greater than a time required for a specified number of the first radio signals to be repeatedly transmitted using the repetition level of the repetition level set that was selected by the infrastructure equipment for repeatedly transmitting the first radio signal.

Paragraph 7. A communications device according to any of Paragraphs 1 to 6, wherein a repetition level of the repetition level set that was selected by the infrastructure equipment for repeatedly transmitting the first radio signal is offset by a predetermined amount, and the criterion on which the early termination indicator is monitored for is whether a time over which the second radio signal is repeatedly transmitted is greater than a time required for a specified number of the first radio signals to be repeatedly transmitted using the offset repetition level.

Paragraph 8. A communications device according to any of Paragraphs 1 to 7, wherein one or more of the first radio signal candidates of the first search space which share the same frequency resources and time resources of the wireless access interface as the candidate used for transmission of the first radio signal are blocked from use, and
- wherein the known subset of the frequency resources and the time resources of the wireless access interface in which the one or more third radio signals can be monitored comprises the frequency resources and the time resources comprising the first radio signal candidates of the first search space which are not blocked from use.

Paragraph 9. A communications device according to Paragraph 8, wherein the known subset of the frequency resources and the time resources of the wireless access interface in which the one or more third radio signals can be received further comprises a part of the known frequency resources and known time resources of the wireless access interface in which at least part of one or more subsequent first signals are received during the transmission of the second radio signal.

Paragraph 10. A communications device according to any of Paragraphs 1 to 9, wherein the known subset of the frequency resources and the time resources of the wireless access interface in which the one or more third radio signals can be received comprises frequency resources and time resources which fall between a configurable start time and a configurable end time.

Paragraph 11. A communications device according to Paragraph 10, wherein the configurable start time is defined relative to a time at which the second signal starts to be transmitted.

Paragraph 12. A communications device according to Paragraph 10 or Paragraph 11, wherein the configurable end time is defined relative to a latest time until which the scheduling information indicates that the communications device should transmit the second signal.

Paragraph 13. A communications device according to any of Paragraphs 10 to 12 wherein the configurable start time is defined relative to a time at which remaining candidates of the first search space following the candidate used for transmission of the first signal starts.

Paragraph 14. A communications device according to any of Paragraphs 10 to 13, wherein the configurable end time is defined relative to an end time of a last candidate of the first search space that overlaps with a latest time until which the scheduling information indicates that the communications device should transmit the second signal.

Paragraph 15. A communications device according to any of Paragraphs 10 to 14, wherein the frequency resources and time resources which fall between the configurable start time and the configurable end time form a third search space in which the one or more third radio signals can be received, the third search space comprising the third radio signal candidates which are associated with a repetition level of the repetition level set that was selected by the infrastructure equipment for transmitting the first radio signal in the first search space.

Paragraph 16. A method of operating a communications device for use in a wireless communications network comprising infrastructure equipment, the method comprising
  monitoring a first search space for a first radio signal from the infrastructure equipment, the first search space containing candidates of the first radio signal each having an associated one of a plurality of repetition levels forming part of a repetition level set, the associated repetition level indicating a number of repetitions with which the candidate may be transmitted, the first radio signal containing scheduling information for the transmission of a second radio signal by the communications device to the infrastructure equipment,
  transmitting, upon detecting the first radio signal in the first search space, the second radio signal to the infrastructure equipment, the second radio signal being repeatedly transmitted a predetermined number of times during each of a plurality of consecutive time periods,
  monitoring a second search space for one or more third radio signals from the infrastructure equipment, the second search space being a portion of known frequency resources and known time resources of the wireless access interface and comprising one or more candidates of the third radio signals each having an associated repetition level of the repetition level set,
  determining that at least one of the third radio signals are monitored during the transmission of the second radio signal, wherein the one or more third radio signals are repeatedly transmitted using one of the candidates of the third radio signals a number of times indicated by the repetition level associated with the selected candidate of the third radio signal,
  monitoring, on the basis of at least one criterion of the first radio signal and/or the second radio signal and/or third radio signal, for an early termination indicator during a known subset of the frequency resources and the time resources of the wireless access interface in which the one or more third radio signals can be received, the early termination indicator being received from the infrastructure equipment and indicating that transmission of the second radio signal to the infrastructure equipment should be terminated, and
  terminating transmission of the second radio signal to the infrastructure equipment on the basis of the received early termination indicator.

Paragraph 17. Circuitry for a communications device for use in a wireless communications network comprising infrastructure equipment, the communications device comprising
  transmitter circuitry configured to transmit signals to the infrastructure equipment via a wireless access interface provided by the wireless communications network,
  receiver circuitry configured to receive signals from the infrastructure equipment via the wireless access interface, and
  controller circuitry configured to control the transmitter circuitry and the receiver circuitry
  to monitor a first search space for a first radio signal from the infrastructure equipment, the first search space containing candidates of the first radio signal each having an associated one of a plurality of repetition levels forming part of a repetition level set, the associated repetition level indicating a number of repetitions with which the candidate may be transmitted, the first radio signal containing scheduling information for the transmission of a second radio signal by the communications device to the infrastructure equipment,
  to transmit, upon detecting the first radio signal in the first search space, the second radio signal to the infrastructure equipment, the second radio signal being repeatedly transmitted a predetermined number of times during each of a plurality of consecutive time periods,
  to monitor a second search space for one or more third radio signals from the infrastructure equipment, the second search space being a portion of known frequency resources and known time resources of the wireless access interface and comprising one or more candidates of the third radio signals each having an associated repetition level of the repetition level set,
  to determine that at least one of the third radio signals are monitored during the transmission of the second radio signal, wherein the one or more third radio signals are repeatedly transmitted using one of the candidates of the third radio signals a number of times indicated by the repetition level associated with the selected candidate of the third radio signal,
  to monitor, on the basis of at least one criterion of the first radio signal and/or the second radio signal and/or third radio signal, for an early termination indicator during a known subset of the frequency resources and the time resources of the wireless access interface in which the one or more third radio signals can be received, the early termination indicator being received from the infrastructure equipment and indicating that transmission of the second radio signal to the infrastructure equipment should be terminated, and to terminate transmission of the second radio signal to the infrastructure equipment on the basis of the received early termination indicator.

Paragraph 18. An infrastructure equipment for use in a wireless communications network comprising a communications device, the infrastructure equipment comprising transmitter circuitry configured to transmit signals to the communications device via a wireless access interface provided by the wireless communications network, receiver circuitry configured to receive signals from the communications device via the wireless access interface, and controller circuitry configured to control the transmitter circuitry and the receiver circuitry to transmit a first radio signal to the communications device in a first search space, the first search space containing candidates of the first radio signal each having an associated one of a plurality of repetition levels forming part of a repetition level set, the associated repetition level indicating a number of repetitions with which the candidate may be transmitted, the first radio signal containing scheduling information for the transmission of a second radio signal by the communications device to the infrastructure equipment, to receive the second radio signal from the communications device, the second radio signal being repeatedly transmitted a predetermined number of times during each of a plurality of consecutive time periods, to transmit, to the communications device in a second search space comprising a portion of known frequency resources and known time resources of the wireless access interface, one or more third radio signals, the second search space being a portion of known frequency resources and known time resources of the wireless access interface and comprising one or more candidates of the third radio signals each having an associated repetition level of the repetition level set, and to transmit, to the communications device, an early termination indicator during a known subset of the frequency resources and the time resources of the wireless access interface in which the one or more third radio signals can be transmitted, the early termination indicator indicating that transmission of the second radio signal to the infrastructure equipment should be terminated.

Paragraph 19. A method of operating an infrastructure equipment for use in a wireless communications network comprising a communications device, the method comprising receiving a first radio signal from the communications device, the first radio signal being repeatedly transmitted a predetermined number of times during each of a plurality of consecutive time periods, transmitting a first radio signal to the communications device in a first search space, the first search space containing candidates of the first radio signal each having an associated one of a plurality of repetition levels forming part of a repetition level set, the associated repetition level indicating a number of repetitions with which the candidate may be transmitted, the first radio signal containing scheduling information for the transmission of a second radio signal by the communications device to the infrastructure equipment, receiving the second radio signal from the communications device, the second radio signal being repeatedly transmitted a predetermined number of times during each of a plurality of consecutive time periods, transmitting, to the communications device in a second search space comprising a portion of known frequency resources and known time resources of the wireless access interface, one or more third radio signals, the second search space being a portion of known frequency resources and known time resources of the wireless access interface and comprising one or more candidates of the third radio signals each having an associated repetition level of the repetition level set, and transmitting, to the communications device, an early termination indicator during a known subset of the frequency resources and the time resources of the wireless access interface in which the one or more third radio signals can be transmitted, the early termination indicator indicating that transmission of the second radio signal to the infrastructure equipment should be terminated.

Paragraph 20. Circuitry for an infrastructure equipment for use in a wireless communications network comprising a communications device, the infrastructure equipment comprising transmitter circuitry configured to transmit signals to the communications device via a wireless access interface provided by the wireless communications network, receiver circuitry configured to receive signals from the communications device via the wireless access interface, and controller circuitry configured to control the transmitter circuitry and the receiver circuitry to transmit a first radio signal to the communications device in a first search space, the first search space containing candidates of the first radio signal each having an associated one of a plurality of repetition levels forming part of a repetition level set, the associated repetition level indicating a number of repetitions with which the candidate may be transmitted, the first radio signal containing scheduling information for the transmission of a second radio signal by the communications device to the infrastructure equipment, to receive the second radio signal from the communications device, the second radio signal being repeatedly transmitted a predetermined number of times during each of a plurality of consecutive time periods, to transmit, to the communications device in a second search space comprising a portion of known frequency resources and known time resources of the wireless access interface, one or more third radio signals, the second search space being a portion of known frequency resources and known time resources of the wireless access interface and comprising one or more candidates of the third radio signals each having an associated repetition level of the repetition level set, and to transmit, to the communications device, an early termination indicator during a known subset of the frequency resources and the time resources of the wireless access interface in which the one or more third radio signals can be transmitted, the early termination indicator indicating that transmission of the second radio signal to the infrastructure equipment should be terminated.

Paragraph 21. A wireless communications system comprising a wireless communications network comprising infrastructure equipment and a communications device, the communications device being configured to monitor a first search space for a first radio signal from the infrastructure equipment, the first search space containing candidates of the first radio signal each having an associated one of a plurality of repetition levels forming part of a repetition level set, the associated repetition level indicating a number of repetitions with which the candidate may be transmitted, the first radio signal containing scheduling information for the transmission of a second radio signal by the communications device to the infrastructure equipment, to transmit, upon detecting the first radio signal in the first search space, the second radio signal to the infrastructure equipment, the second radio signal being repeatedly transmitted a predetermined number of times during each of a plurality of consecutive time periods, to monitor a second search space for one or more third radio signals from the infrastructure equipment, the second search space being a portion of known frequency resources and known time resources of the wireless access interface and comprising one or more candidates of the third radio signals each having an associated repetition level of the repetition level set, to determine that at least one of the third radio signals are monitored during the transmission of the second radio signal, wherein the one or more third radio signals are repeatedly transmitted using one of the candidates of the third radio signals a number of times indicated by the repetition level associated with the selected candidate of the third radio signal, to monitor, on the basis of at least one criterion of the first radio signal and/or the second radio signal and/or third radio signal, for an early termination indicator during a known subset of the frequency resources and the time resources of the wireless access interface in which the one or more third radio signals can be received, the early termination indicator being received from the infrastructure equipment and indicating that transmission of the second radio signal to the infrastructure equipment should be terminated, and to terminate transmission of the second radio signal to the infrastructure equipment on the basis of the received early termination indicator.

Paragraph 22. A method of operating a wireless communications system comprising a wireless communications network comprising infrastructure equipment and a communications device, the method comprising monitoring a first search space for a first radio signal from the infrastructure equipment, the first search space containing candidates of the first radio signal each having an associated one of a plurality of repetition levels forming part of a repetition level set, the associated repetition level indicating a number of repetitions with which the candidate may be transmitted, the first radio signal containing scheduling information for the transmission of a second radio signal by the communications device to the infrastructure equipment, transmitting, upon detecting the first radio signal in the first search space, the second radio signal to the infrastructure equipment, the second radio signal being repeatedly transmitted a predetermined number of times during each of a plurality of consecutive time periods, monitoring a second search space for one or more third radio signals from the infrastructure equipment, the second search space being a portion of known frequency resources and known time resources of the wireless access interface and comprising one or more candidates of the third radio signals each having an associated repetition level of the repetition level set, determining that at least one of the third radio signals are monitored during the transmission of the second radio signal, wherein the one or more third radio signals are repeatedly transmitted using one of the candidates of the third radio signals a number of times indicated by the repetition level associated with the selected candidate of the third radio signal, monitoring, on the basis of at least one criterion of the first radio signal and/or the second radio signal and/or third radio signal, for an early termination indicator during a known subset of the frequency resources and the time resources of the wireless access interface in which the one or more third radio signals can be received, the early termination indicator being received from the infrastructure equipment and indicating that transmission of the second radio signal to the infrastructure equipment should be terminated, and terminating transmission of the second radio signal to the infrastructure equipment on the basis of the received early termination indicator.

Paragraph 23. Circuitry for a wireless communications system comprising a wireless communications network comprising infrastructure equipment and a communications device, the communications device being configured to monitor a first search space for a first radio signal from the infrastructure equipment, the first search space containing candidates of the first radio signal each having an associated one of a plurality of repetition levels forming part of a repetition level set, the associated repetition level indicating a number of repetitions with which the candidate may be transmitted, the first radio signal containing scheduling information for the transmission of a second radio signal by the communications device to the infrastructure equipment, to transmit, upon detecting the first radio signal in the first search space, the second radio signal to the infrastructure equipment, the second radio signal being repeatedly transmitted a predetermined number of times during each of a plurality of consecutive time periods, to monitor a second search space for one or more third radio signals from the infrastructure equipment, the second search space being a portion of known frequency resources and known time resources of the wireless access interface and comprising one or more candidates of the third radio signals each having an associated repetition level of the repetition level set, to determine that at least one of the third radio signals are monitored during the transmission of the second radio signal, wherein the one or more third radio signals are repeatedly transmitted using one of the candidates of the third radio signals a number of times indicated by the repetition level associated with the selected candidate of the third radio signal, to monitor, on the basis of at least one criterion of the first radio signal and/or the second radio signal and/or third radio signal, for an early termination indicator during a known subset of the frequency resources and the time resources of the wireless access interface in which the one or more third radio signals can be received, the early termination indicator being received from the infrastructure equipment and indicating that transmission of the second radio signal to the infrastructure equipment should be terminated, and to terminate transmission of the second radio signal to the infrastructure equipment on the basis of the received early termination indicator.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] RP-161464, "Revised WID for Further Enhanced MTC for LTE," Ericsson, 3GPP TSG RAN Meeting #73, New Orleans, USA, Sep. 19-22, 2016
[3] RP-161901, "Revised work item proposal: Enhancements of NB-IoT", Huawei, HiSilicon, 3GPP TSG RAN Meeting #73, New Orleans, USA, Sep. 19-22, 2016.
[4] RP-170732, "New WID on Even further enhanced MTC for LTE," Ericsson, Qualcomm, 3GPP TSG RAN Meeting #75, Dubrovnik, Croatia, Mar. 6-9, 2017.
[5] RP-170852, "New WID on Further NB-IoT enhancements," Huawei, HiSilicon, Neul, 3GPP TSG RAN Meeting #75, Dubrovnik, Croatia, Mar. 6-9, 2017
[6] 3GPP TS 36.311, "Radio Resource Control (RRC)," Third Generation Partnership Project, Release 14.
[7] R1-1719712, "Remaining issues on UL HARQ-ACK feedback for MTC," ZTE, Sanechips, RAN1 #91.

What is claimed is:

1. A communications device for use in a wireless communications network comprising infrastructure equipment, the communications device comprising
transmitter circuitry configured to transmit signals to the infrastructure equipment via a wireless access interface provided by the wireless communications network,
receiver circuitry configured to receive signals from the infrastructure equipment via the wireless access interface, and
controller circuitry configured to control the transmitter circuitry and the receiver circuitry
to monitor a first search space for a first radio signal from the infrastructure equipment, the first search space containing candidates of the first radio signal each having an associated one of a plurality of repetition levels forming part of a repetition level set, the associated repetition level indicating a number of repetitions with which the candidate may be transmitted, the first radio signal containing scheduling information for the transmission of a second radio signal by the communications device to the infrastructure equipment,
to transmit, upon detecting the first radio signal in the first search space, the second radio signal to the infrastructure equipment, the second radio signal being repeatedly transmitted a predetermined number of times during each of a plurality of consecutive time periods,
to monitor a second search space for one or more third radio signals from the infrastructure equipment, the second search space being a portion of known frequency resources and known time resources of the wireless access interface and comprising one or more candidates of the third radio signals each having an associated repetition level of the repetition level set,
to determine that at least one of the third radio signals are monitored during the transmission of the second radio signal, wherein the one or more third radio signals are repeatedly transmitted using one of the candidates of the third radio signals a number of times indicated by the repetition level associated with the selected candidate of the third radio signal,
to monitor, on the basis of at least one criterion of the first radio signal and/or the second radio signal and/or third radio signal, for an early termination indicator during a known subset of the frequency resources and the time resources of the wireless access interface in which the one or more third radio signals can be received, the early termination indicator being received from the infrastructure equipment and indicating that transmission of the second radio signal to the infrastructure equipment should be terminated, and
to terminate transmission of the second radio signal to the infrastructure equipment on the basis of the received early termination indicator.

2. A communications device according to claim 1, wherein the criterion on which the early termination indicator is monitored for is whether a time over which the second radio signal is repeatedly transmitted is greater than a time required for a specified number of the first radio signals to be repeatedly transmitted using a highest of the repetition levels of the repetition level set.

3. A communications device according to claim 1, wherein the criterion on which the early termination indicator is monitored for is whether a time over which the second radio signal is repeatedly transmitted is greater than a time required for a specified number of the third radio signals to be repeatedly transmitted using a highest of the repetition levels of the repetition level set.

4. A communications device according to claim 1, wherein between two search spaces of the third radio signal, an offset period of a predetermined duration is present, and
wherein the criterion on which the early termination indicator is monitored for is whether a time over which the second radio signal is repeatedly transmitted is greater than a time required for a specified candidate of the third radio signal to be transmitted using a highest of the repetition levels of the repetition level set in addition to the duration of the specified number of offset periods.

5. A communication device according to claim 1, wherein the known subset of the frequency resources and the time resources of the wireless access interface in which the second search space for the third radio signal is located is the same as the frequency resources and the time resources used for the first search space of the first radio signal.

6. A communications device according to claim 1, wherein the criterion on which the early termination indicator is monitored for is whether a time over which the second radio signal is repeatedly transmitted is greater than a time required for a specified number of the first radio signals to be repeatedly transmitted using the repetition level of the repetition level set that was selected by the infrastructure equipment for repeatedly transmitting the first radio signal.

7. A communications device according to claim 1, wherein a repetition level of the repetition level set that was selected by the infrastructure equipment for repeatedly transmitting the first radio signal is offset by a predetermined amount, and the criterion on which the early termination indicator is monitored for is whether a time over which the second radio signal is repeatedly transmitted is greater than a time required for a specified number of the first radio signals to be repeatedly transmitted using the offset repetition level.

8. A communications device according to claim 1, wherein one or more of the first radio signal candidates of the first search space which share the same frequency resources and time resources of the wireless access interface as the candidate used for transmission of the first radio signal are blocked from use, and
wherein the known subset of the frequency resources and the time resources of the wireless access interface in which the one or more third radio signals can be monitored comprises the frequency resources and the time resources comprising the first radio signal candidates of the first search space which are not blocked from use.

9. A communications device according to claim 8, wherein the known subset of the frequency resources and the time resources of the wireless access interface in which the one or more third radio signals can be received further comprises a part of the known frequency resources and known time resources of the wireless access interface in which at least part of one or more subsequent first signals are received during the transmission of the second radio signal.

10. A communications device according to claim 1, wherein the known subset of the frequency resources and the time resources of the wireless access interface in which the one or more third radio signals can be received comprises frequency resources and time resources which fall between a configurable start time and a configurable end time.

11. A communications device according to claim 10, wherein the configurable start time is defined relative to a time at which the second signal starts to be transmitted.

12. A communications device according to claim 10, wherein the configurable end time is defined relative to a latest time until which the scheduling information indicates that the communications device should transmit the second signal.

13. A communications device according to claim 10 wherein the configurable start time is defined relative to a time at which remaining candidates of the first search space following the candidate used for transmission of the first signal starts.

14. A communications device according to claim 10, wherein the configurable end time is defined relative to an end time of a last candidate of the first search space that overlaps with a latest time until which the scheduling information indicates that the communications device should transmit the second signal.

15. A communications device according to claim 10, wherein the frequency resources and time resources which fall between the configurable start time and the configurable end time form a third search space in which the one or more third radio signals can be received, the third search space comprising the third radio signal candidates which are associated with a repetition level of the repetition level set that was selected by the infrastructure equipment for transmitting the first radio signal in the first search space.

16. A method of operating a communications device for use in a wireless communications network comprising infrastructure equipment, the method comprising
monitoring a first search space for a first radio signal from the infrastructure equipment, the first search space containing candidates of the first radio signal each having an associated one of a plurality of repetition levels forming part of a repetition level set, the associated repetition level indicating a number of repetitions with which the candidate may be transmitted, the first radio signal containing scheduling information for the transmission of a second radio signal by the communications device to the infrastructure equipment,
transmitting, upon detecting the first radio signal in the first search space, the second radio signal to the infrastructure equipment, the second radio signal being repeatedly transmitted a predetermined number of times during each of a plurality of consecutive time periods,
monitoring a second search space for one or more third radio signals from the infrastructure equipment, the second search space being a portion of known frequency resources and known time resources of the wireless access interface and comprising one or more candidates of the third radio signals each having an associated repetition level of the repetition level set,
determining that at least one of the third radio signals are monitored during the transmission of the second radio signal, wherein the one or more third radio signals are repeatedly transmitted using one of the candidates of the third radio signals a number of times indicated by the repetition level associated with the selected candidate of the third radio signal,
monitoring, on the basis of at least one criterion of the first radio signal and/or the second radio signal and/or third radio signal, for an early termination indicator during a known subset of the frequency resources and the time resources of the wireless access interface in which the one or more third radio signals can be received, the early termination indicator being received from the infrastructure equipment and indicating that transmission of the second radio signal to the infrastructure equipment should be terminated, and
terminating transmission of the second radio signal to the infrastructure equipment on the basis of the received early termination indicator.

17. Circuitry for a communications device for use in a wireless communications network comprising infrastructure equipment, the communications device comprising transmitter circuitry configured to transmit signals to the infrastructure equipment via a wireless access interface provided by the wireless communications network, receiver circuitry configured to receive signals from the infrastructure equipment via the wireless access interface, and controller circuitry configured to control the transmitter circuitry and the receiver circuitry to monitor a first search space for a first radio signal from the infrastructure equipment, the first search space containing candidates of the first radio signal each having an associated one of a plurality of repetition levels forming part of a repetition level set, the associated repetition level indicating a number of repetitions with which the candidate may be transmitted, the first radio signal containing scheduling information for the transmission of a second radio signal by the communications device to the infrastructure equipment, to transmit, upon detecting the first radio signal in the first search space, the second radio signal to the infrastructure equipment, the second radio signal being repeatedly transmitted a predetermined number of times during each of a plurality of consecutive time periods, to monitor a second search space for one or more third radio signals from the infrastructure equipment, the second search space being a portion of known frequency resources and known time resources of the wireless access interface and comprising one or more candidates of the third radio signals each having an associated repetition level of the repetition level set, to determine that at least one of the third radio signals are monitored during the transmission of the second radio signal, wherein the one or more third radio signals are repeatedly transmitted using one of the candidates of the third radio signals a number of times indicated by the repetition level associated with the selected candidate of the third radio signal, to monitor, on the basis of at least one criterion of the first radio signal and/or the second radio signal and/or third radio signal, for an early termination indicator during a known subset of the frequency resources and the time resources of the wireless access interface in which the one or more third radio signals can be received, the early termination indicator being received from the infrastructure equipment and indicating that transmission of the second radio signal to the infrastructure equipment should be terminated, and to terminate transmission of the second radio signal to the infrastructure equipment on the basis of the received early termination indicator.

18. An infrastructure equipment for use in a wireless communications network comprising a communications device, the infrastructure equipment comprising transmitter circuitry configured to transmit signals to the communications device via a wireless access interface provided by the wireless communications network, receiver circuitry configured to receive signals from the communications device via the wireless access interface, and controller circuitry configured to control the transmitter circuitry and the receiver circuitry to transmit a first radio signal to the communications device in a first search space, the first search space containing candidates of the first radio signal each having an associated one of a plurality of repetition levels forming part of a repetition level set, the associated repetition level indicating a number of repetitions with which the candidate may be transmitted, the first radio signal containing scheduling information for the transmission of a second radio signal by the communications device to the infrastructure equipment, to receive the second radio signal from the communications device, the second radio signal being repeatedly transmitted a predetermined number of times during each of a plurality of consecutive time periods, to transmit, to the communications device in a second search space comprising a portion of known frequency resources and known time resources of the wireless access interface, one or more third radio signals, the second search space being a portion of known frequency resources and known time resources of the wireless access interface and comprising one or more candidates of the third radio signals each having an associated repetition level of the repetition level set, and to transmit, to the communications device, an early termination indicator during a known subset of the frequency resources and the time resources of the wireless access interface in which the one or more third radio signals can be transmitted, the early termination indicator indicating that transmission of the second radio signal to the infrastructure equipment should be terminated.

19. A method of operating an infrastructure equipment for use in a wireless communications network comprising a communications device, the method comprising receiving a first radio signal from the communications device, the first radio signal being repeatedly transmitted a predetermined number of times during each of a plurality of consecutive time periods, transmitting a first radio signal to the communications device in a first search space, the first search space containing candidates of the first radio signal each having an associated one of a plurality of repetition levels forming part of a repetition level set, the associated repetition level indicating a number of repetitions with which the candidate may be transmitted, the first radio signal containing scheduling information for the transmission of a second radio signal by the communications device to the infrastructure equipment, receiving the second radio signal from the communications device, the second radio signal being repeatedly transmitted a predetermined number of times during each of a plurality of consecutive time periods, transmitting, to the communications device in a second search space comprising a portion of known frequency resources and known time resources of the wireless access interface, one or more third radio signals, the second search space being a portion of known frequency resources and known time resources of the wireless access interface and comprising one or more candidates of the third radio signals each having an associated repetition level of the repetition level set, and transmitting, to the communications device, an early termination indicator during a known subset of the frequency resources and the time resources of the wireless access interface in which the one or more third radio signals can be transmitted, the early termination indicator indicating that transmission of the second radio signal to the infrastructure equipment should be terminated.

20. Circuitry for an infrastructure equipment for use in a wireless communications network comprising a communications device, the infrastructure equipment comprising
transmitter circuitry configured to transmit signals to the communications device via a wireless access interface provided by the wireless communications network,
receiver circuitry configured to receive signals from the communications device via the wireless access interface, and
controller circuitry configured to control the transmitter circuitry and the receiver circuitry
to transmit a first radio signal to the communications device in a first search space, the first search space containing candidates of the first radio signal each having an associated one of a plurality of repetition levels forming part of a repetition level set, the associated repetition level indicating a number of repetitions with which the candidate may be transmitted, the first radio signal containing scheduling information for the transmission of a second radio signal by the communications device to the infrastructure equipment,
to receive the second radio signal from the communications device, the second radio signal being repeatedly transmitted a predetermined number of times during each of a plurality of consecutive time periods,
to transmit, to the communications device in a second search space comprising a portion of known frequency resources and known time resources of the wireless access interface, one or more third radio signals, the second search space being a portion of known frequency resources and known time resources of the wireless access interface and comprising one or more candidates of the third radio signals each having an associated repetition level of the repetition level set, and
to transmit, to the communications device, an early termination indicator during a known subset of the frequency resources and the time resources of the wireless access interface in which the one or more third radio signals can be transmitted, the early termination indicator indicating that transmission of the second radio signal to the infrastructure equipment should be terminated.

21. A wireless communications system comprising a wireless communications network comprising infrastructure equipment and a communications device, the communications device being configured
to monitor a first search space for a first radio signal from the infrastructure equipment, the first search space containing candidates of the first radio signal each having an associated one of a plurality of repetition levels forming part of a repetition level set, the associated repetition level indicating a number of repetitions with which the candidate may be transmitted, the first radio signal containing scheduling information for the transmission of a second radio signal by the communications device to the infrastructure equipment,
to transmit, upon detecting the first radio signal in the first search space, the second radio signal to the infrastructure equipment, the second radio signal being repeatedly transmitted a predetermined number of times during each of a plurality of consecutive time periods,
to monitor a second search space for one or more third radio signals from the infrastructure equipment, the second search space being a portion of known frequency resources and known time resources of the wireless access interface and comprising one or more candidates of the third radio signals each having an associated repetition level of the repetition level set,
to determine that at least one of the third radio signals are monitored during the transmission of the second radio signal, wherein the one or more third radio signals are repeatedly transmitted using one of the candidates of the third radio signals a number of times indicated by the repetition level associated with the selected candidate of the third radio signal,
to monitor, on the basis of at least one criterion of the first radio signal and/or the second radio signal and/or third radio signal, for an early termination indicator during a known subset of the frequency resources and the time resources of the wireless access interface in which the one or more third radio signals can be received, the early termination indicator being received from the infrastructure equipment and indicating that transmission of the second radio signal to the infrastructure equipment should be terminated, and
to terminate transmission of the second radio signal to the infrastructure equipment on the basis of the received early termination indicator.

22. A method of operating a wireless communications system comprising a wireless communications network comprising infrastructure equipment and a communications device, the method comprising
monitoring a first search space for a first radio signal from the infrastructure equipment, the first search space containing candidates of the first radio signal each having an associated one of a plurality of repetition levels forming part of a repetition level set, the associated repetition level indicating a number of repetitions with which the candidate may be transmitted, the first radio signal containing scheduling information for the transmission of a second radio signal by the communications device to the infrastructure equipment,
transmitting, upon detecting the first radio signal in the first search space, the second radio signal to the infrastructure equipment, the second radio signal being repeatedly transmitted a predetermined number of times during each of a plurality of consecutive time periods,
monitoring a second search space for one or more third radio signals from the infrastructure equipment, the second search space being a portion of known frequency resources and known time resources of the wireless access interface and comprising one or more candidates of the third radio signals each having an associated repetition level of the repetition level set,
determining that at least one of the third radio signals are monitored during the transmission of the second radio signal, wherein the one or more third radio signals are repeatedly transmitted using one of the candidates of the third radio signals a number of times indicated by the repetition level associated with the selected candidate of the third radio signal,
monitoring, on the basis of at least one criterion of the first radio signal and/or the second radio signal and/or third radio signal, for an early termination indicator during a known subset of the frequency resources and the time resources of the wireless access interface in which the one or more third radio signals can be received, the early termination indicator being received from the infrastructure equipment and indicating that transmission of the second radio signal to the infrastructure equipment should be terminated, and terminating transmission of the second radio signal to the infrastructure equipment on the basis of the received early termination indicator.

23. Circuitry for a wireless communications system comprising a wireless communications network comprising infrastructure equipment and a communications device, the communications device being configured to monitor a first search space for a first radio signal from the infrastructure equipment, the first search space containing candidates of the first radio signal each having an associated one of a plurality of repetition levels forming part of a repetition level set, the associated repetition level indicating a number of repetitions with which the candidate may be transmitted, the first radio signal containing scheduling information for the transmission of a second radio signal by the communications device to the infrastructure equipment, to transmit, upon detecting the first radio signal in the first search space, the second radio signal to the infrastructure equipment, the second radio signal being repeatedly transmitted a predetermined number of times during each of a plurality of consecutive time periods, to monitor a second search space for one or more third radio signals from the infrastructure equipment, the second search space being a portion of known frequency resources and known time resources of the wireless access interface and comprising one or more candidates of the third radio signals each having an associated repetition level of the repetition level set, to determine that at least one of the third radio signals are monitored during the transmission of the second radio signal, wherein the one or more third radio signals are repeatedly transmitted using one of the candidates of the third radio signals a number of times indicated by the repetition level associated with the selected candidate of the third radio signal, to monitor, on the basis of at least one criterion of the first radio signal and/or the second radio signal and/or third radio signal, for an early termination indicator during a known subset of the frequency resources and the time resources of the wireless access interface in which the one or more third radio signals can be received, the early termination indicator being received from the infrastructure equipment and indicating that transmission of the second radio signal to the infrastructure equipment should be terminated, and to terminate transmission of the second radio signal to the infrastructure equipment on the basis of the received early termination indicator.

\* \* \* \* \*